(12) United States Patent
Naoi

(10) Patent No.: US 11,074,935 B2
(45) Date of Patent: Jul. 27, 2021

(54) MAGNETIC RECORDING MEDIUM AND MAGNETIC RECORDING AND REPRODUCING APPARATUS

(71) Applicant: FUJIFILM Corporation, Tokyo (JP)

(72) Inventor: Kenji Naoi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/801,371

(22) Filed: Feb. 26, 2020

(65) Prior Publication Data
US 2020/0273490 A1 Aug. 27, 2020

(30) Foreign Application Priority Data
Feb. 27, 2019 (JP) .............................. JP2019-033443

(51) Int. Cl.
| | | |
|---|---|---|
| G11B 5/706 | (2006.01) | |
| G11B 5/735 | (2006.01) | |
| G11B 5/592 | (2006.01) | |
| G11B 5/008 | (2006.01) | |
| G11B 5/584 | (2006.01) | |
| G11B 5/588 | (2006.01) | |

(52) U.S. Cl.
CPC ...... *G11B 5/70678* (2013.01); *G11B 5/00817* (2013.01); *G11B 5/5926* (2013.01); *G11B 5/735* (2013.01); *G11B 5/584* (2013.01); *G11B 5/588* (2013.01)

(58) Field of Classification Search
None
See application file for complete search history.

(56) References Cited

U.S. PATENT DOCUMENTS

| | | | |
|---|---|---|---|
| 5,689,384 A | 11/1997 | Albrecht et al. | |
| 10,643,647 B2 * | 5/2020 | Kasada | G11B 5/00817 |
| 10,679,655 B2 * | 6/2020 | Ozawa | G11B 5/584 |
| 10,755,735 B2 * | 8/2020 | Ozawa | G11B 5/71 |
| 10,811,048 B2 * | 10/2020 | Ozawa | G11B 5/70684 |
| 10,878,846 B2 * | 12/2020 | Kasada | G11B 5/70 |
| 2020/0251134 A1 * | 8/2020 | Kasada | G11B 5/78 |
| 2020/0251135 A1 * | 8/2020 | Kasada | G11B 5/708 |
| 2020/0251136 A1 * | 8/2020 | Ozawa | G11B 5/78 |
| 2020/0251138 A1 * | 8/2020 | Ozawa | G11B 5/70 |
| 2021/0043228 A1 * | 2/2021 | Naoi | G11B 5/714 |
| 2021/0043229 A1 * | 2/2021 | Naoi | G11B 5/008 |

* cited by examiner

*Primary Examiner* — Tan X Dinh
(74) *Attorney, Agent, or Firm* — Sughrue Mion, PLLC

(57) ABSTRACT

The magnetic recording medium includes: a non-magnetic support; and a magnetic layer including ferromagnetic powder and a binding agent, wherein the ferromagnetic powder is selected from the group consisting of hexagonal strontium ferrite powder and ε-iron oxide powder, and has an average particle size of 5 nm or more and 20 nm or less, wherein the magnetic layer has a servo pattern, and wherein an average area Sdc of magnetic clusters of the magnetic recording medium in a DC demagnetization state, measured by a magnetic force microscope is $0.2 \times 10^4$ $nm^2$ or more and less than $5.0 \times 10^4$ $nm^2$.

16 Claims, 4 Drawing Sheets

MAGNETIC RECORDING MEDIUM AND MAGNETIC RECORDING AND REPRODUCING APPARATUS

CROSS-REFERENCE TO RELATED APPLICATIONS

This application claims priority under 35 U.S.C 119 to Japanese Patent Application No. 2019-033443 filed on Feb. 27, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing apparatus.

2. Description of the Related Art

An increase in recording capacity (high capacity) of a magnetic recording medium is required in accordance with a great increase in information content in recent years. As means for realizing this high capacity, a technology of disposing a larger amount of data tracks in a magnetic layer by narrowing a width of the data track to increase recording density is used.

However, in a case where the width of the data track is narrowed and the recording and/or reproducing of data is performed by allowing the magnetic recording medium to run in a magnetic recording and reproducing apparatus, it is difficult that a magnetic head correctly follows the data tracks, and errors may easily occur at the time of recording and/or reproducing. Thus, as means for reducing occurrence of such errors, a system that performs head tracking using a servo signal (hereinafter, referred to as a "servo system") has been recently proposed and practically used (for example, see U.S. Pat. No. 5,689,384A).

SUMMARY OF THE INVENTION

In a magnetic servo type servo system among the servo systems, a servo pattern is formed in the magnetic layer of the magnetic recording medium, and tracking on the data track is performed with a servo signal obtained by magnetically reading this servo pattern. More specific description is as follows.

First, a servo signal reading element reads the servo pattern formed in the magnetic layer to obtain the servo signal. Next, in accordance with the obtained servo signal, a position of the magnetic head in the magnetic recording and reproducing apparatus is controlled to allow the magnetic head to follow the data track. Accordingly, in a case where the magnetic recording medium is run in the magnetic recording and reproducing apparatus to record or reproduce data on the magnetic recording medium, even though a position of the magnetic recording medium fluctuates with respect to the magnetic head, it is possible to allow the magnetic head to follow the data track. In order to record data on the magnetic recording medium more accurately and/or to reproduce the data recorded on the magnetic recording medium more accurately, it is desirable to improve accuracy of allowing the magnetic head to follow the data track (hereinafter, referred to as "head positioning accuracy") in the servo system.

Incidentally, the magnetic recording medium is roughly classified into two types of a coating type and a metal thin film type. A coating type magnetic recording medium has a magnetic layer including ferromagnetic powder and a binding agent. Various types of ferromagnetic powder have been proposed as the ferromagnetic powder for use in the magnetic layer of a coating type magnetic recording medium (hereinafter, simply referred to as a "magnetic recording medium"). Therefore, in recent years, from a viewpoint of high density recording adequacy or the like, hexagonal strontium ferrite powder and $\varepsilon$-iron oxide powder are attracting attention.

Accordingly, an object of an aspect of the present invention is to provide a magnetic recording medium comprising a magnetic layer including ferromagnetic powder selected from the group consisting of hexagonal strontium ferrite powder and $\varepsilon$-iron oxide powder to improve head positioning accuracy in a servo system.

An aspect of the present invention relates to a magnetic recording medium comprising: a non-magnetic support; and a magnetic layer including ferromagnetic powder and a binding agent, wherein the ferromagnetic powder is selected from the group consisting of hexagonal strontium ferrite powder and $\varepsilon$-iron oxide powder, and has an average particle size of 5 nm or more and 20 nm or less, wherein the magnetic layer has a servo pattern, and wherein an average area Sdc of magnetic clusters of the magnetic recording medium in a DC demagnetization state, measured by a magnetic force microscope is $0.2 \times 10^4$ nm$^2$ or more and less than $5.0 \times 10^4$ nm$^2$.

In an aspect, a ratio Sdc/Sac of the Sdc to an average area Sac of magnetic clusters of the magnetic recording medium in an AC demagnetization state, measured by a magnetic force microscope may be 0.8 or more and 2.0 or less.

In an aspect, the magnetic recording medium may be a magnetic tape, and the servo pattern may be a timing-based servo pattern. In addition, In an aspect, an edge shape of the timing-based servo pattern, specified by magnetic force microscopy may be a shape in which a difference $L_{99.9}-L_{0.1}$ between a value $L_{99.9}$ of a cumulative distribution function of 99.9% and a value $L_{0.1}$ of a cumulative distribution function of 0.1% in a position deviation width from an ideal shape of the magnetic tape in a longitudinal direction is 180 nm or less.

In an aspect, the Sdc may be $0.2 \times 10^4$ nm$^2$ or more and less than $0.3 \times 10^4$ nm$^2$.

Another aspect of the present invention relates to a magnetic recording and reproducing apparatus comprising: the magnetic recording medium described above; and a magnetic head.

According to an aspect of the present invention, it is possible to provide a magnetic recording medium comprising a magnetic layer including ferromagnetic powder selected from the group consisting of hexagonal strontium ferrite powder and $\varepsilon$-iron oxide powder to improve head positioning accuracy in a servo system. According to an aspect of the present invention, it is possible to provide a magnetic recording and reproducing apparatus including such a magnetic recording medium.

DESCRIPTION OF THE PREFERRED EMBODIMENTS

Magnetic Recording Medium

Figure 1:
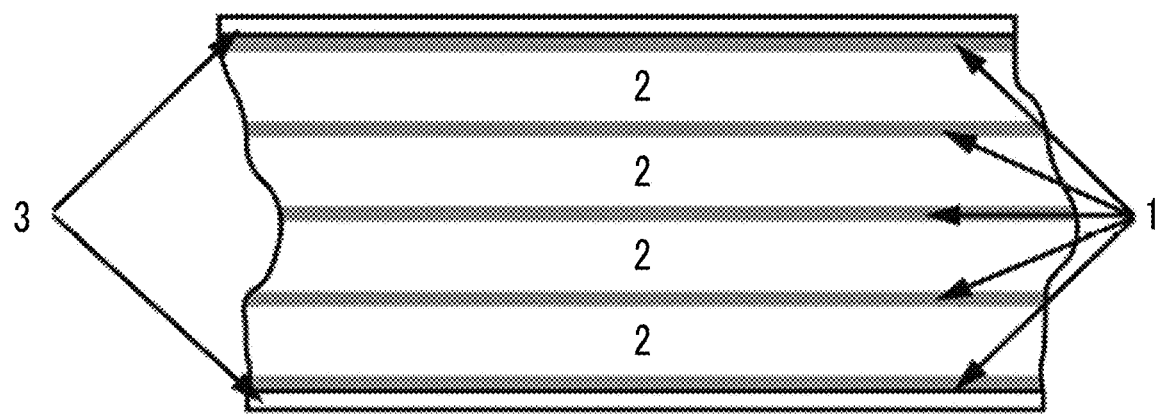
FIG. 1 shows a disposition example of data bands and servo bands.

An aspect of the present invention relates to a magnetic recording medium comprising: a non-magnetic support; and a magnetic layer including ferromagnetic powder and a binding agent, wherein the ferromagnetic powder is selected from the group consisting of hexagonal strontium ferrite powder and ε-iron oxide powder, and has an average particle size of 5 nm or more and 20 nm or less, wherein the magnetic layer has a servo pattern, and wherein an average area Sdc of magnetic clusters of the magnetic recording medium in a DC demagnetization state, measured by a magnetic force microscope is $0.2 \times 10^4$ nm$^2$ or more and less than $5.0 \times 10^4$ nm$^2$.

The servo pattern is a magnetization region and is formed by magnetizing a specific region of the magnetic layer by a servo write head. A shape of the region magnetized by the servo write head is determined by standards. It is considered that head positioning accuracy in the servo system can be improved as the servo pattern is formed in a shape closer to a design shape (for example, an ideal shape, details of which will be described later). However, the magnetic layer including ferromagnetic powder selected from the group consisting of hexagonal strontium ferrite powder and ε-iron oxide powder tends to be higher in an anisotropy magnetic field Hk than a magnetic layer including ferromagnetic powder (for example, a hexagonal barium ferrite powder) used in the related art as ferromagnetic powder for a magnetic recording medium. It is considered that this is due to one cause that a shape of a servo pattern formed on the magnetic layer including ferromagnetic powder selected from the group consisting of hexagonal strontium ferrite powder and ε-iron oxide powder easily deviates from the design shape.

With respect to this, as a result of intensive studies, the present inventor has found that it is possible to improve head positioning accuracy of the magnetic recording medium comprising the magnetic layer including ferromagnetic powder selected from the group consisting of hexagonal strontium ferrite powder and ε-iron oxide powder in a servo system by using ferromagnetic powder having an average particle size of 5 nm or more and 20 nm or less as ferromagnetic powder selected from the group consisting of hexagonal strontium ferrite powder and ε-iron oxide powder and by controlling an existence state of the above described ferromagnetic powder in the magnetic layer so that the Sdc is $0.2 \times 10^4$ nm$^2$ or more and less than $5.0 \times 10^4$ nm$^2$. Further, regarding the Sdc, JP2002-358625A discloses that a magnetic cluster in a DC demagnetization state is a part where magnetic particles aggregate and function as one large magnetic body (see a paragraph 0014 of the same publication), and is a minimum unit of recording (a paragraph 0019 of the same publication). Based on these descriptions, it can be expected that easiness of forming the servo pattern (magnetization region) on the magnetic layer depends only on a size of the magnetic cluster in the DC demagnetization state described as a minimum unit of recording, that is, magnetization in JP2002-358625A. However, while the present inventor has repeatedly studied, regarding the magnetic recording medium having the magnetic layer containing ferromagnetic powder selected from the group consisting of hexagonal strontium ferrite powder and ε-iron oxide powder, it has been determined that, in addition to the average area Sdc of the magnetic clusters in the DC demagnetization state, the average particle size also affects the head positioning accuracy in the servo system. This point is a new knowledge found by the present inventor, which has not been known in the related art. In addition, as a result of further intensive studies, the present inventor has newly found that it is possible to improve head positioning accuracy in the servo system by the magnetic recording medium according to an aspect of the present invention comprising a magnetic layer including ferromagnetic powder selected from the group consisting of hexagonal strontium ferrite powder and ε-iron oxide powder.

In the present invention and this specification, the average area Sdc of the magnetic clusters of the magnetic recording medium in the DC demagnetization state and the average area Sac of the magnetic clusters of the magnetic recording medium in the AC demagnetization state are values obtained by the following method by measurement using a magnetic force microscope (MFM).

The Sdc is a value obtained by the following method.

A sample is DC (direct current) demagnetized with an application magnetic field of 10 kOe (1 [kOe]=$10^6/\pi$ [A/m]) and then a magnetic force image in a square region (5 μm×5 μm) in which one side of the DC demagnetized sample is 5 μm is obtained by a magnetic force microscope. An area of the magnetic force image is calculated using known image analysis software after noise removal and hole filling treatment of the obtained magnetic force image are performed. The above operation is performed on magnetic force images obtained at 10 different randomly selected portions on a magnetic layer surface, an arithmetic average (an average area) of areas of the magnetic force images is calculated. The average area calculated in this manner is referred to as the Sdc.

In a case where the Sdc and Sac for a certain magnetic recording medium are obtained, two samples cut out from the same magnetic recording medium are prepared, and one sample is used for DC demagnetization in order to measure the Sdc and the other sample is used for AC demagnetization in order to measure the Sdc.

The Sac is a value obtained by the following method.

Using a magnetic force microscope, a magnetic force image in a square region (5 μm×5 μm) in which one side of a magnetic layer surface of a sample demagnetized (alternating current (AC) demagnetized) in an alternating magnetic field having a frequency of 60 Hz (hertz) is 5 μm is obtained. An area of the magnetic force image is calculated using known image analysis software after noise removal and hole filling treatment of the obtained magnetic force image are performed. The above operation is performed on magnetic force images obtained at 10 different randomly selected portions on a magnetic layer surface, an arithmetic average (an average area) of areas of the magnetic force images is calculated. The average area calculated in this manner is referred to as the Sac.

In addition, Sdc/Sac is calculated as a ratio of the Sdc to the Sac obtained as described above.

Acquisition of the magnetic force image performed using a magnetic force microscope is performed using a commercially available or known magnetic force microscope in a frequency modulation (FM) mode. As a probe of a magnetic force microscope, for example, SSS-MFMR (nominal curvature radius 15 nm) manufactured by Nanoworld AG can be used. A distance between a magnetic layer surface and a probe distal end during magnetic force microscopy is in a range of 20 to 50 nm. In addition, as image analysis software, commercially available analysis software or analysis software in which a known arithmetic expression is incorporated can be used.

In addition, in the present invention and this specification, unless otherwise noted, an average particle size of various types of powder such as the ferromagnetic powder is a value measured by the following method using a transmission electron microscope.

The powder is imaged at a magnification ratio of 100,000 with a transmission electron microscope, and the image is printed on printing paper, is displayed on a display, or the like so that the total magnification ratio becomes 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder (hereinafter, also referred to as "D").

A "coefficient of variation in particle size distribution" of the ferromagnetic powder described later is obtained by multiplying the value obtained by dividing a standard deviation G in particle sizes of 500 particles obtained as described above by an average particle size D by 100. That is, a coefficient of variation in particle size distribution (%)=(σ/D)×100.

As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and this specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is interposed between the particles. The term "particle" is used to describe powder in some cases.

As a method of taking sample powder from the magnetic tape in order to measure the particle size, a method disclosed in a paragraph of 0015 of JP2011-048878A can be used, for example.

In the present invention and this specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

Hereinafter, the magnetic recording medium will be described more specifically. In the following, head positioning accuracy in a servo system for a magnetic recording medium comprising a magnetic layer including ferromagnetic powder selected from the group consisting of hexagonal strontium ferrite powder and ε-iron oxide powder is simply referred to as "head positioning accuracy in a servo system".

Ferromagnetic Powder

Average Particle Size

The ferromagnetic powder included in the magnetic layer of the magnetic recording medium is selected from the group consisting of hexagonal strontium ferrite powder and ε-iron oxide powder, and has an average particle size of 5 nm or more and 20 nm or less. A point that the average particle size of the ferromagnetic powder is 5 nm or more and 20 nm or less can contribute to improvement of head positioning accuracy in the servo system. From a viewpoint of further improving head positioning accuracy in a servo system, the average particle size is preferably 6 nm or more, more preferably 7 nm or more, still more preferably 8 nm or more, still more preferably 9 nm or more, and still more preferably 10 nm or more. From the same viewpoint, the average particle size is preferably 19 nm or less, more preferably 18 nm or less, still more preferably 17 nm or less, still more preferably 16 nm or less, and still more preferably 15 nm or less.

The magnetic layer of the magnetic recording medium includes ferromagnetic powder that has an average particle size in the above described range and is selected from the group consisting of hexagonal strontium ferrite powder and ε-iron oxide powder. The ferromagnetic powder of the magnetic layer may include only hexagonal strontium ferrite powder, may include only ε-iron oxide powder, or may include hexagonal strontium ferrite powder and ε-iron oxide powder. Hereinafter, the hexagonal strontium ferrite powder and ε-iron oxide powder will be described.

Hexagonal Strontium Ferrite Powder

In the present invention and this specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and this specification, the hexagonal strontium ferrite powder means that the main divalent metal atom included in the powder is a strontium atom. In addition, the hexagonal barium ferrite powder means that the main divalent metal atom included in this powder is a barium atom. The main divalent metal atom refers to a divalent metal atom that accounts for the most on an at % basis among divalent metal atoms included in the powder. Here, a rare earth atom is not included in the above divalent metal atom. The "rare earth atom" in the present invention and this specification is selected from the group consisting of a scandium atom (Sc), a yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

An index for reducing thermal fluctuation, in other words, improving thermal stability may include an anisotropy constant Ku. The hexagonal strontium ferrite powder may preferably have Ku of $1.8 \times 10^5$ J/m$^3$ or more, and more preferably have a Ku of $2.0 \times 10^5$ J/m$^3$ or more. Ku of the hexagonal strontium ferrite powder may be, for example, $2.5 \times 10^5$ J/m$^3$ or less. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and this specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth bulk content >1.0. A rare earth atom content in hexagonal strontium ferrite powder which will be described later is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content >1.0" means that in a particle of hexagonal strontium ferrite powder, rare earth atoms are unevenly distributed in a surface layer portion (that is, more than an inside). The surface layer portion in the present invention and this specification means a partial region from a surface of a particle configuring hexagonal strontium ferrite powder toward an inside.

In a case where hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring hexagonal strontium ferrite powder contribute to suppression of a decrease in a reproducing output in repeated reproduction. It is supposed that this is because hexagonal strontium ferrite powder includes a rare earth atom with a bulk content in the above range, and rare earth atoms are unevenly distributed in a surface layer portion of a particle configuring hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproducing output during repeated reproduction. It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that hexagonal strontium ferrite powder having rare earth atom surface layer portion uneven distribution property can also contribute to an improvement of running durability of the magnetic recording medium. It is supposed that this may be because uneven distribution of rare earth atoms on a surface of a particle configuring hexagonal strontium ferrite powder contributes to an improvement of interaction between the particle surface and an organic substance (for example, a binding agent and/or an additive) included in the magnetic layer, and, as a result, a strength of the magnetic layer is improved.

From a viewpoint of further suppressing a decrease in reproducing output during repeated reproduction and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and this specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This also applies to other components in the present invention and this specification. That is, unless otherwise noted, a certain component may be used alone or in combination of two or more. A content amount or content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproducing output in repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be 1.5 or more. A "surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and the "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic recording medium, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-091747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 ml of 1 mol/L hydrochloric acid is held on a hot plate at a set temperature of 70° C. for 1 hour. The obtained solution is filtered by a membrane filter of 0.1 µm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 ml of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproducing output in a case of reproducing information recorded on the magnetic recording medium, it is desirable that mass magnetization σs of the ferromagnetic powder included in the magnetic recording medium is high. In this regard, the hexagonal strontium ferrite powder including a rare earth atom but not having the rare earth atom surface layer portion uneven distribution property tends to have σS largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 A·m²/kg or more, and may be 47 A·m²/kg or more. On the other hand, from a viewpoint of noise reduction, σs is preferably 80 A·m²/kg or less and more preferably 60 A·m²/kg or less. σs can be measured using a known measuring device, such as a vibrating sample magnetometer, capable of measuring magnetic properties. In the present invention and this specification, unless otherwise noted, the mass magnetization σs is a value measured at a magnetic field intensity of 15 kOe.

In an aspect, a coercivity Hc of the hexagonal strontium ferrite powder can be 2000 Oe or more. A coercivity Hc of the hexagonal strontium ferrite powder can be, for example, 25 kOe or less. Here, the coercive force may be more than 25 kOe. In general, there is a tendency that a ferromagnetic powder having a higher coercivity Hc has a higher anisotropy constant Ku and is preferable from a viewpoint of thermal stability. A coercivity He of the ferromagnetic powder can be obtained by a known measuring device (for example, a vibrating sample magnetometer) as a device for measuring magnetic properties.

Regarding the content (bulk content) of a constituent atom of the hexagonal strontium ferrite powder, a strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also called an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From a viewpoint of further suppressing a decrease in reproducing output in repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and this specification, "not include" for a certain atom means that a content measured by an ICP analyzer after total dissolution is 0 mass %. A detection limit of the ICP analyzer is usually 0.01 parts per million (ppm) or less on a mass basis. The "not included" is used as a meaning including that an atom is included in an amount less than the detection limit of the ICP analyzer. In an aspect, the hexagonal strontium ferrite powder may not include a bismuth atom (Bi).

In a case where the magnetic recording medium includes hexagonal strontium ferrite powder in the magnetic layer, the anisotropy magnetic field Hk of the magnetic layer is preferably 14.0 kOe or more, more preferably 16.0 kOe or more, and still more preferably, 18.0 kOe or more. In addition, the anisotropy magnetic field Hk of the magnetic layer is preferably 90.0 kOe or less, more preferably 80.0 kOe or less, and still more preferably 70.0 kOe or less.

The anisotropy magnetic field Hk in the present invention and this specification refers to a magnetic field in which magnetization is saturated in a case where a magnetic field is applied in a magnetization hard axis direction. The anisotropy magnetic field Hk can be measured using a known measuring device, such as a vibrating sample magnetometer, capable of measuring magnetic properties. In the magnetic layer including hexagonal strontium ferrite powder, the magnetization hard axis direction of the magnetic layer is an in-plane direction.

ε-Iron Oxide Powder

In the present invention and this specification, "ε-iron oxide powder" refers to ferromagnetic powder in which a ε-iron oxide type crystal structure is detected as a main phase by X-ray diffraction analysis. For example, in a case where the highest intensity diffraction peak is attributed to a ε-iron oxide type crystal structure in an X-ray diffraction spectrum obtained by X-ray diffraction analysis, it is determined that the ε-iron oxide type crystal structure is detected as the main phase. As a manufacturing method of the ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280-S284, J. Mater. Chem. C, 2013, 1, pp. 5200-5206 can be referred to, for example. Here, the manufacturing method of ε-iron oxide powder capable of being used as the ferromagnetic powder in the magnetic layer of the magnetic recording medium is not limited to the methods described here.

An index for reducing thermal fluctuation, in other words, improving thermal stability may include an anisotropy constant Ku. The ε-iron oxide powder preferably has Ku of $3.0 \times 10^4$ J/m³ or more, and more preferably has Ku of $8.0 \times 10^4$ J/m³ or more. Ku of the ε-iron oxide powder may be, for example, $3.0 \times 10^5$ J/m³ or less. Here, it means that the higher Ku is, the higher thermal stability is, this is preferable, and thus, a value thereof is not limited to the values exemplified above.

From a viewpoint of increasing the reproducing output in a case of reproducing information recorded on the magnetic recording medium, it is desirable that mass magnetization σs of the ferromagnetic powder included in the magnetic recording medium is high. In this regard, in an aspect, σs of the ε-iron oxide powder may be 8 A·m²/kg or more, and may be 12 A·m²/kg or more. On the other hand, from a viewpoint of noise reduction, σs of the ε-iron oxide powder is preferably 40 A·m²/kg or less and more preferably 35 A·m²/kg or less.

In an aspect, a coercivity Hc of the ε-iron oxide powder can be 2000 Oe or more. A coercivity He of the ε-iron oxide powder can be, for example, 25 kOe or less. Here, the coercive force may be more than 25 kOe.

In a case where the magnetic recording medium includes ε-iron oxide powder in the magnetic layer, the anisotropy magnetic field Hk of the magnetic layer is preferably 18.0 kOe or more, more preferably 30.0 kOe or more, and still more preferably, 38.0 kOe or more. In addition, the anisotropy magnetic field Hk of the magnetic layer is preferably 100.0 kOe or less, more preferably 90.0 kOe or less, and still more preferably 75.0 kOe or less. In the magnetic layer including ε-iron oxide powder, the magnetization hard axis direction of the magnetic layer is an in-plane direction.

Physical Properties of Magnetic Cluster

Sdc

With respect to the magnetic recording medium, an average area Sdc of magnetic clusters of the magnetic recording medium in a DC demagnetization state, measured by a magnetic force microscope is $0.2 \times 10^4$ nm² or more and less than $5.0 \times 10^4$ nm². This can also contribute to improvement of head positioning accuracy in a servo system. From a viewpoint of further improving the head positioning accuracy in the servo system, the Sdc is preferably $4.5 \times 10^4$ nm² or less, more preferably $4.0 \times 10^4$ nm² or less, still more preferably $3.5 \times 10^4$ nm² or less, still more preferably $3.0 \times 10^4$ nm² or less, still more preferably $2.5 \times 10^4$ nm² or less, still more preferably $2.0 \times 10^4$ nm² or less, still more preferably $1.5 \times 10^4$ nm² or less, still more preferably $1.0 \times 10^4$ nm² or less, still more preferably $0.5 \times 10^4$ nm² or less, and still more preferably less than $0.3 \times 10^4$ nm². Further, in an aspect, the Sdc can be $0.3 \times 10^4$ nm² or more, $0.5 \times 10^4$ nm² or more, or $1.0 \times 10^4$ nm² or more.

Sdc/Sac

In the magnetic recording medium, a ratio (Sdc/Sac) of the Sdc to an average area Sac of magnetic clusters of the magnetic recording medium in an AC demagnetization state, measured by a magnetic force microscope is preferably 0.8 or more and 2.0 or less. The above ratio (Sdc/Sac) is also considered to be a value that can serve as an index indicating an existence state of the ferromagnetic powder in the magnetic layer. Specifically, in the magnetic layer of the magnetic recording medium in an AC demagnetization state, each ferromagnetic particle faces in a random direction, and the total magnetization becomes near zero. Therefore, each ferromagnetic particle can exist in a state of an approximately primary particle. Therefore, it can be said that a size of the magnetic cluster in an AC demagnetization state (specifically, the average area Sac) is a value that does not depend on an aggregation state of the ferromagnetic particles in the magnetic layer. On the other hand, the size of the magnetic cluster in a DC demagnetization state (specifically, an average area Sdc) corresponds to the size of the aggregate of the ferromagnetic particles, varies depending on the degree of aggregation of the ferromagnetic particles in the magnetic layer, and the value thereof tends to increase as the ferromagnetic particles aggregate. Therefore, it is considered that the smaller the difference between the Sdc and the Sac is, the more the aggregation of the ferromagnetic particles configuring the ferromagnetic powder is suppressed. Accordingly, a state where the ratio (Sdc/Sac) is 0.8 or more and 2.0 or less is preferable from a viewpoint of further improving head positioning accuracy in a servo system for the magnetic recording medium comprising the magnetic layer that includes ferromagnetic powder selected from the group consisting of hexagonal strontium ferrite powder and ε-iron oxide powder. From a viewpoint of further more improving head positioning accuracy in a servo system, the ratio (Sdc/Sac) is more preferably 1.8 or less, still more preferably 1.6 or less, still more preferably 1.4 or less, still more preferably 1.2 or less, and still more preferably 1.0 or less. The lower limit of the ratio (Sdc/Sac) is 0.80 as is known (see, for example, a paragraph 0010 of JP2004-103186A). Further, JP2004-103186A describes the above ratio (Sdc/Sac), but the same publication does no describe an implication that the above ratio (Sdc/Sac) can affect the head positioning accuracy in the servo system for the magnetic recording medium comprising the magnetic layer that includes ferromagnetic powder selected from the group consisting of hexagonal strontium ferrite powder and ε-iron oxide powder.

The Sac can be in the range described above for the Sdc, for example. Here, in the present invention, the Sac is not limited to such a range.

The Sac can be controlled mainly by the average particle size of the ferromagnetic powder used for forming the magnetic layer. On the other hand, the Sdc can be controlled mainly by suppressing aggregation of ferromagnetic particles in the magnetic layer. Means for suppressing aggregation can include the following means, for example.

Dispersion conditions during preparation of a magnetic layer forming composition are adjusted.

As a binding agent included in the magnetic layer, a binding agent having a high affinity with a solvent used for preparing the magnetic layer forming composition is used.

After the magnetic layer forming composition is coated on a non-magnetic support optionally via a non-magnetic layer, treatment for cracking the aggregation of ferromagnetic particles is performed.

Regarding the above and other control means, for example, a paragraph 0023 of JP2002-358625A and examples of the same publication, and paragraphs 0012, 0021, 0028 and 0032 of JP2004-103186A and examples of the same publication can be referred to.

Moreover, from a viewpoint of suppressing aggregation of the ferromagnetic particles configuring the ferromagnetic powder, it is preferable to use a ferromagnetic powder having a high uniformity in particle size. In this regard, an index of the uniformity in particle size can include a coefficient of variation in particle size distribution. A method for calculating a coefficient of variation in particle size distribution is as described above. The ferromagnetic powder included in the magnetic layer of the magnetic recording medium has a coefficient of variation in particle size distribution of preferably 40% or less, more preferably 38% or less, still more preferably 35% or less, still more preferably 33% or less, still more preferably 30% or less, and still more preferably 28% or less. In addition, the coefficient of variation in particle size distribution can be, for example, 4% or more, 6% or more, 8% or more, 10% or more, 12% or more, 14% or more, 16% or more, 18% or more, or 20% or more.

Here, the coefficient of variation in particle size distribution can be below the values exemplified above. The average particle size and the coefficient of variation in particle size distribution can be adjusted depending on manufacturing conditions of the ferromagnetic powder. As an example, in a case where the heat treatment is included in a process of manufacturing the ferromagnetic powder, there is a tendency that the longer the heat treatment time is, the larger the average particle size is and the larger the coefficient of variation in the particle size distribution is.

In an aspect, a surface polishing treatment of a magnetic layer surface can be performed mainly in order to reduce the value of the Sdc. The surface polishing treatment of the magnetic layer surface can be performed by polishing the magnetic layer surface by a known method as a method for cleaning a surface of the magnetic recording medium using cleaning means that is usually used for cleaning the magnetic layer surface such as a nonwoven fabric or a razor blade, for example.

Hereinafter, the magnetic recording medium will be described more specifically.

Magnetic Layer

The magnetic recording medium is a coating type magnetic recording medium, and the magnetic layer includes a binding agent together with the ferromagnetic powder. One or more types of resins are used as the binding agent. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-024113A can be referred to. An average molecular weight of the resin used as the binding agent can be, for example, 10,000 or more and 200,000 or less as a weight-average molecular weight. The weight-average molecular weight of the present invention and this specification is a value obtained by performing polystyrene conversion of a value measured by gel permeation chromatography (GPC). As measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

In addition, a curing agent can also be used together with the resin which can be used as the binding agent. As the curing agent, in an aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent can be included in the magnetic layer in a state of being reacted (crosslinked) with other components such as the binding agent, by proceeding the curing reaction in a magnetic layer forming step. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The content amount of the curing agent in the magnetic layer forming composition can be, for example, 0 to 80.0 parts by mass, and is preferably 50.0 to 80.0 parts by mass with respect to 100.0 parts by mass of the binding agent.

Additive

The magnetic layer may include ferromagnetic powder and a binding agent, and, as necessary, include one or more kinds of additives. As the additives, the curing agent described above is used as an example. In addition, examples of the additive which can be included in the magnetic layer include non-magnetic powder (for example, inorganic powder or carbon black), a lubricant, a dispersing agent, a dispersing assistant, an antibacterial agent, an antistatic agent, and an antioxidant. For example, for the lubricant, descriptions disclosed in paragraphs 0030 to 0033, 0035, and 0036 of JP2016-126817A can be referred to. The non-magnetic layer described later may include a lubricant. For the lubricant which may be included in the non-magnetic layer, descriptions disclosed in paragraphs 0030, 0031, and 0034 to 0036 of JP2016-126817A can be referred to. For the dispersing agent, descriptions disclosed in paragraphs 0061 and 0071 of JP2012-133837A can be referred to. A dispersing agent may be added to a non-magnetic layer forming composition. For the dispersing agent which can be included in the non-magnetic layer forming composition, a description disclosed in paragraph 0061 of JP2012-133837A can be referred to. As the non-magnetic powder that can be included in the magnetic layer, non-magnetic powder which can function as an abrasive, or non-magnetic powder which can function as a projection formation agent which forms projections suitably protruded from the magnetic layer surface (for example, non-magnetic colloidal particles) is used. As the additive, a commercially available product can be suitably selected or manufactured by a well-known method according to the desired properties, and any amount thereof can be used.

Non-Magnetic Layer

In an aspect, the magnetic recording medium may comprise a magnetic layer directly on a non-magnetic support. In an aspect, the magnetic recording medium may comprise a non-magnetic layer including non-magnetic powder and a binding agent between the non-magnetic support and the magnetic layer.

The non-magnetic powder used in the non-magnetic layer may be powder of inorganic substance (inorganic powder) or powder of organic substance (organic powder). In addition, carbon black and the like can be used. Examples of the inorganic substance include metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon Hack which can be used in the non-magnetic layer, descriptions disclosed in paragraphs 0040 and 0041 of JP2010-024113A can be referred to. The content (filling percentage) of the non-magnetic powder of the non-magnetic layer is preferably in a range of 50 to 90 mass % and more preferably in a range of 60 to 90 mass %.

In regards to other details of a binding agent or an additive of the non-magnetic layer, the well-known technology regarding the non-magnetic layer of the coating type magnetic recording medium can be applied. In addition, in regards to the type and the content of the binding agent, and the type and the content of the additive, for example, the well-known technology regarding the magnetic layer of the coating type magnetic recording medium can be applied.

The "non-magnetic layer" of the present invention and this specification also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. It is preferable that the non-magnetic layer does not have a residual magnetic flux density and a coercivity.

Non-Magnetic Support

As the non-magnetic support (hereinafter, also simply referred to as a "support"), well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Back Coating Layer

The magnetic recording medium may or may not include a back coating layer including non-magnetic powder and a binding agent on a surface side of the non-magnetic support opposite to the surface provided with the magnetic layer. Preferably, the back coating layer includes one or both of carbon black and inorganic powder. In regards to the binding agent included in the back coating layer and various additives which can be randomly included in the back coating layer, the well-known technology regarding the back coating layer of the coating type magnetic recording medium can be applied, and the well-known technology regarding a list of the magnetic layer and/or the non-magnetic layer of the coating type magnetic recording medium can be applied. For example, for the back coating layer, descriptions disclosed in paragraphs 0018 to 0020 of JP2006-331625A and page 4, line 65 to page 5, line 38 of U.S. Pat. No. 7,029,774B can be referred to.

Thicknesses of Non-Magnetic Support and Each Layer

A thickness of the non-magnetic support is, for example, 3.0 to 80.0 μm, preferably 3.0 to 20.0 μm, and more preferably 3.0 to 10.0 μm.

A thickness of the magnetic layer can be optimized according to a saturation magnetization amount of the used magnetic head, a head gap length, a band of a recording signal, and the like, is generally in a range of 10 nm to 150 nm, and, from a viewpoint of high density recording, is preferably in a range of 20 nm to 120 nm and more preferably in a range of 30 nm to 100 nm. There is a tendency that the thinner the magnetic layer is, the smaller the value of the Sdc is. The magnetic layer may be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.05 to 3.0 μm, preferably 0.1 to 2.0 μm, and more preferably 0.1 to 1.5 μm.

A thickness of the back coating layer is preferably equal to or smaller than 0.9 μm and more preferably 0.1 to 0.7 μm.

The various thicknesses are obtained by exposing a cross section of the magnetic recording medium in a thickness direction by known means such as an ion beam or a microtome, and then performing a cross section observation using a scanning transmission electron microscope (STEM), as an arithmetic average of values of thicknesses obtained for 10 locations randomly selected therefrom. For specific examples of a method of measuring a thickness, descriptions relating to a method of measuring a thickness in examples which will be described later can be referred to.

Manufacturing Step

Manufacturing Step of Magnetic Recording Medium Having Servo Pattern

A step of manufacturing a composition for forming the magnetic layer, the non-magnetic layer, or the back coating layer generally includes at least a kneading step, a dispersing step, and a mixing step provided before and after these steps, as necessary. Each step may be divided into two or more stages. Various components may be added at an initial stage or in a middle stage of each step. In addition, each component may be separately added in two or more steps. In order to manufacture the magnetic recording medium, a known manufacturing technology relating to a coating type magnetic recording medium can be used for a portion or all of the steps. For example, in the kneading step, preferably, a kneader having a strong kneading force such as an open kneader, a continuous kneader, a pressure kneader, or an extruder is used. For details of the kneading processes, descriptions disclosed in JP1989-106338A (JP-H01-106338A) and JP1989-079274A (JP-H01-079274A) can be referred to. Also, glass beads as dispersed beads can be used to disperse each layer forming composition. Furthermore, as the dispersed beads, zirconia beads, titania beads, and steel beads which are dispersed beads having a high specific gravity are also suitable. These dispersed beads can be used by optimizing the particle diameter (bead diameter) and filling rate. As a dispersing device, a well-known dispersing device can be used. Each layer forming composition may be filtered by a well-known method, before subjecting to a coating step. The filtering can be performed by using a filter, for example. As the filter used in the filtering, a filter having a pore diameter of 0.01 to 3 μm (for example, filter made of glass fiber or filter made of polypropylene) can be used, for example.

The magnetic layer can be formed, for example, by directly coating the magnetic layer forming composition onto the non-magnetic support or performing multilayer coating of the magnetic layer forming composition with the non-magnetic layer forming composition in order or at the same time. In an aspect in which an orientation process is performed, the orientation process is performed on a coating layer of the magnetic layer forming composition in an orientation zone while the coating layer is in a wet state. For the orientation process, the various well-known technologies such as descriptions disclosed in a paragraph 0052 of JP2010-024113A can be applied. For example, a vertical orientation process can be performed by a well-known method such as a method using a polar opposing magnet. In an orientation zone, a drying speed of the coating layer can be controlled depending on a temperature and a flow rate of dry air and/or a transportation speed in the orientation zone. In addition, the coating layer may be preliminarily dried before the transportation to the orientation zone. The back coating layer can be formed by coating the back coating layer forming composition to a side of the non-magnetic support opposite to a side provided with the magnetic layer (or to be provided with the magnetic layer).

A calendering process can be performed at any stage after coating of each layer forming composition is performed. As conditions of the calendering process are tightened, the value of the Sdc tends to decrease. Examples of conditions of the calendering process include a type of a calender roll, a calendering pressure, a calendering temperature (a surface temperature of the calender roll), the number of the calendering processes, and the like. The calendering pressure can be, for example, 200 to 500 kN/m and preferably 250 to 350 kN/m, the calendering temperature can be, for example, 70° C. to 120° C. and preferably 80° C. to 100° C., and the number of the calendering processes can be, for example, 1 to 8 times. In addition, as a roll having a hard surface is used as the calender roll, the magnetic layer surface tends to be smoothed.

Further, for details of the method of manufacturing the magnetic recording medium, for example, paragraphs 0051 to 0057 of JP2010-024113 A can be referred to.

Formation of Servo Pattern

It is possible to form a servo pattern in the magnetic recording medium manufactured as described above by a known method in order to enable tracking control of the magnetic head in the magnetic recording and reproducing apparatus, control of a running speed of the magnetic tape, and the like. The "formation of servo pattern" can also be referred to as "recording of servo signal". The magnetic recording medium may be a tape-shaped magnetic recording medium (magnetic tape) or may be a disk-shaped magnetic recording medium (magnetic disk). Hereinafter, the formation of the servo pattern will be described using a magnetic tape as an example.

The servo pattern is usually formed along a longitudinal direction of the magnetic tape. Examples of control (servo control) types using a servo signal include a timing-based servo (TBS), an amplitude servo, and a frequency servo.

As shown in a european computer manufacturers association (ECMA)-319, a magnetic tape (generally called "LTO tape") conforming to a linear tape-open (LTO) standard employs a timing-based servo type. In this timing-based servo type, the servo pattern is formed by continuously disposing a plurality of pairs of non-parallel magnetic stripes (also referred to as "servo stripes") in a longitudinal direction of the magnetic tape. In the present invention and this specification, the "timing-based servo pattern" refers to a servo pattern in which head tracking in a servo system of the timing-based servo type is possible. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319. In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading element elements.

As shown in ECMA-319, information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for servo signal recording (servo pattern forming) head is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like. In addition, as the servo write head, for example, a servo write head having a leakage magnetic field in the range of 1800 to 5000 Oe, preferably 2500 to 5000 Oe can be used.

Before the servo pattern is formed on the magnetic tape, the magnetic tape is usually subjected to a demagnetization (erasing) process. This erasing process can be performed by applying a uniform magnetic field to the magnetic tape using a direct current magnet or an alternating current magnet. The erasing process includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two methods. A first method is horizontal DC erasing of applying a magnetic field in one direction along a longitudinal direction of the magnetic tape. A second method is vertical DC erasing of applying a magnetic field in one direction along a thickness direction of the magnetic tape. The erasing process may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

In an aspect, the magnetic recording medium can be a magnetic tape having a timing-based servo pattern in the magnetic layer. The timing-based servo pattern is formed as a plurality of servo patterns having two or more different shapes on the magnetic layer by the servo write head. In an example, the plurality of servo patterns having two or more different shapes are continuously disposed at constant interval for each of the plurality of servo patterns having the same shape. In another example, different types of servo patterns are alternately disposed. Regarding the servo patterns having the same shape, position deviation in an edge shape of the servo patterns is ignored. Hereinafter, the timing-based servo pattern is also simply referred to as a servo pattern. In the present invention and this specification, an edge shape of the timing-based servo pattern, specified by magnetic force microscopy is also referred to as a shape of an edge (end side) located on a downstream side in a magnetic tape running direction (hereinafter, referred to simply as a "running direction") in a case where data (information) is recorded.

Difference ($L_{99.9}-L_{0.1}$)

As described above, it is considered that head positioning accuracy in the servo system can be improved as the servo pattern is formed in a shape closer to a design shape. The difference ($L_{99.9}-L_{0.1}$) obtained by the method described in detail below is a value that can serve as an index that the timing-based servo pattern is formed in a shape closer to the design shape. From a viewpoint of further improving head positioning accuracy in a servo system, the difference ($L_{99.9}-L_{0.1}$) is preferably 180 nm or less, more preferably 170 nm or less, still more preferably 160 nm or less, and still more preferably 150 nm or less. Further, the difference ($L_{99.9}-L_{0.1}$) may be, for example, 50 nm or more, 60 nm or more, 70 nm or more, 80 nm or more, 90 nm or more, or 100 nm or more. However, the smaller the value of the difference ($L_{99.9}-L_{0.1}$) is, the more preferable it is from a viewpoint of improving the head positioning accuracy in the servo system. Therefore, the difference ($L_{99.9}-L_{0.1}$) is may be below the lower limit exemplified above. In a magnetic tape comprising a magnetic layer including hexagonal strontium ferrite powder and ε-iron oxide powder, the value of the difference ($L_{99.9}-L_{0.1}$) required for the timing-based servo pattern can be controlled with the average particle size of the ferromagnetic powder, the Sdc, or the like.

Hereinafter, in the present invention and in this specification, an edge shape of the timing-based servo pattern, specified by magnetic force microscopy, a difference ($L_{99.9}-L_{0.1}$) between a value $L_{99.9}$ of a cumulative distribution function of 99.9% and a value $L_{0.1}$ of a cumulative distribution function of 0.1% in a position deviation width of the edge shape from an ideal shape of the magnetic tape in a longitudinal direction, and an ideal shape will be described.

Hereinafter, a linear servo pattern that continuously extends from one side toward the other side of the magnetic tape in a width direction and is inclined at an angle as with respect to a width direction of the magnetic tape will be mainly described as an example. The angle α refers to an angle formed by a line segment connecting two end portions in a tape width direction of the edge of the servo pattern located on a downstream side with respect to a running direction of the magnetic tape in a case where data (information) is recorded, and a width direction of the magnetic tape. This will be further described below including this point.

Figure 2:
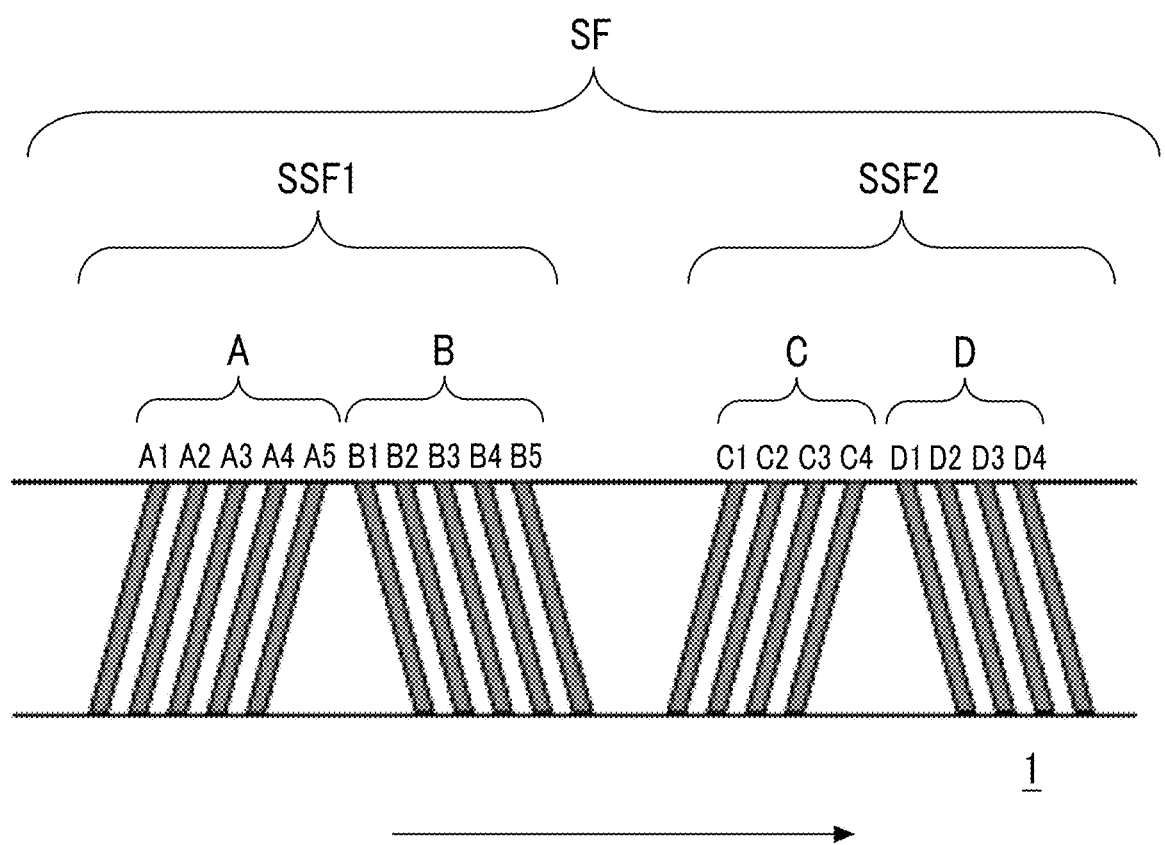
FIG. 2 shows a servo pattern disposition example of a linear tape-open (LTO) ultrium format tape.

For example, in a magnetic tape applied in a linear scanning method widely used as a recording method of the magnetic tape apparatus, in general, a plurality of regions in each of which a servo pattern is formed (referred to as a "servo band") exist on the magnetic layer along a longitudinal direction of the magnetic tape. A region interposed between two adjacent servo bands is referred to as a data band. The recording of data is performed on the data band, and a plurality of data tracks are formed on each data band along a longitudinal direction. FIG. 1 shows a disposition example of data bands and servo bands. In FIG. 1, in the magnetic layer of the magnetic tape MT, a plurality of servo bands 1 are disposed between the guide bands 3. A plurality of regions 2 each of which is interposed between two servo bands are data bands. The servo pattern is a magnetization region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted with respect to a tape width direction as shown in FIG. 2 are formed on a servo band, in a case of manufacturing a magnetic tape. Specifically, in FIG. 2, a servo frame SF on the servo band 1 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C)

and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. Although one servo frame is shown in FIG. 2, a plurality of servo frames are disposed in each servo band in a running direction. In FIG. 2, an arrow shows the running direction. A running direction side of the arrow is an upstream side, and the opposite side is a downstream side.

Figure 3:
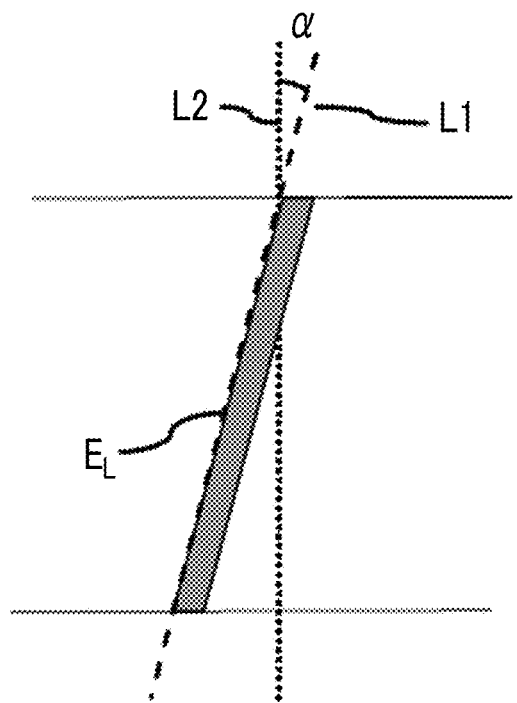
FIG. 3 is a view for describing an angle α regarding an edge shape of a servo pattern.
Figure 4:
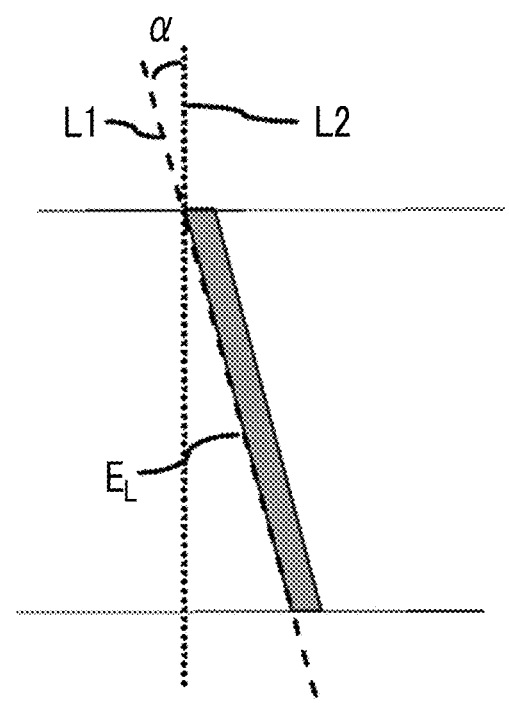
FIG. 4 is a view for describing an angle α regarding an edge shape of the servo pattern.

FIGS. 3 and 4 are views for describing an angle α. In the servo pattern shown in FIG. 2, in the servo pattern that is inclined toward an upstream side in a running direction like servo patterns A1 to A5 and C1 to C4, an angle formed by a line segment connecting two end portions of a downstream edge $E_L$ (a broken line L1 in FIG. 3) and a tape width direction (a broken line L2 in FIG. 3) is defined as an angle α. On the other hand, in the servo pattern that is inclined toward a downstream side in a running direction like servo patterns B1 to B5 and D1 to D4, an angle formed by a line segment connecting two end portions of an downstream edge $E_L$ (a broken line L1 in FIG. 4) and a tape width direction (a broken line L2 in FIG. 4) is defined as an angle α. This angle α is generally referred to as an azimuth angle and is determined by the setting of the servo write head in a case of forming a magnetization region (servo pattern) on the servo band.

Figure 5:
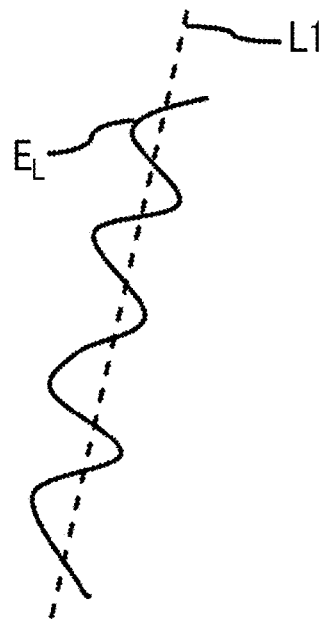
FIG. 5 shows an example of the edge shape of the servo pattern.

In a case where the magnetization region (servo pattern) is formed on a servo band, in a case where the servo pattern is ideally formed as a design shape, an edge shape of the servo pattern inclined at an angle α with respect to the magnetic tape width direction coincides with a shape of a line segment connecting the two end portions of the edge (a broken line L1 in FIGS. 3 and 4). That is, the shape becomes a straight line. Therefore, at each portion on the edge, the position deviation width from the ideal shape of the magnetic tape in a longitudinal direction (hereinafter, also simply referred to as "position deviation width") becomes zero. On the other hand, as shown in an example in FIG. 5, an edge shape of the servo pattern may deviate from the ideal shape. The difference ($L_{99.9}$–$L_{0.1}$) is a value to be an index that the position deviation width from the ideal shape is small at each edge position of the servo pattern and that variation in the position deviation width at each edge portion is small. The difference ($L_{99.9}$–$L_{0.1}$) is a value obtained by the following method.

A magnetic layer surface of the magnetic tape on which the servo pattern is formed is observed with a magnetic force microscope (MFM). A measurement range is a range including five servo patterns. For example, in an LTO Ultrium format tape, five servo patterns of the A burst or the B burst can be observed by setting the measurement range to 90 μm×90 μm. A servo pattern (magnetization region) is extracted by measuring the measurement range at a 100 nm pitch (rough measurement). In the present invention and this specification, the "magnetic layer surface" is identical to a surface of the magnetic recording medium on a magnetic layer side.

Thereafter, in order to detect a boundary between the magnetization region and the non-magnetization region at the edge of the servo pattern located on a downstream side with respect to a running direction, a magnetic profile is obtained by performing measurement at a 5 nm pitch in the vicinity of the boundary. In a case where the obtained magnetic profile is inclined at an angle α with respect to a width direction of the magnetic tape, the magnetic profile is rotationally corrected by analysis software so as to be along the magnetic tape width direction (α=0°). Thereafter, position coordinates of a peak value of each profile measured at a 5 nm pitch are calculated by analysis software. The position coordinates of this peak value indicate a position of a boundary between the magnetization region and the non-magnetization region. The position coordinates are specified by, for example, an xy coordinate system in which a running direction is an x coordinate and a width direction is a y coordinate.

In an example of a case where the ideal shape is a straight line and position coordinates of a certain position on the straight line are (x, y)=(a, b), in a case where the edge shape actually obtained (position coordinates of the boundary) is coincident with an ideal shape, the calculated position coordinates are (x, y)=(a, b). In this case, a position deviation width is zero. On the other hand, in a case where the edge shape actually obtained is deviated from an ideal shape, the x-coordinate of the position of y=b of the boundary is x=a+c or x=a−c. x=a+c is, for example, a case where a width c is deviated on an upstream side with respect to a running direction, and x=a−c is, for example, a case where a width c is deviated on a downstream side with respect to a running direction (that is, −c on the basis of the upstream side). Here, c is a position deviation width. That is, an absolute value of a position deviation width of the x coordinate from an ideal shape is a position deviation width from the ideal shape of the magnetic tape in the longitudinal direction. Thus, a position deviation width at each edge portion on a downstream side of the running direction of the magnetic profile obtained by measurement at 5 nm pitch is obtained.

From the values obtained for each servo pattern, the cumulative distribution function is obtained by analysis software. From the obtained cumulative distribution function, the value $L_{99.9}$ of a cumulative distribution function of 99.9% and the value $L_{0.1}$ of a cumulative distribution function of 0.1% are obtained, and a difference ($L_{99.9}$–$L_{0.1}$) is obtained for each servo pattern from the obtained values.

The above measurement is performed in three different measurement ranges (the number of measurements N=3).

An arithmetic average of differences ($L_{99.9}$–$L_{0.1}$) obtained for each servo pattern is defined as the above difference ($L_{99.9}$–$L_{0.1}$) for the magnetic tape.

Figure 6:
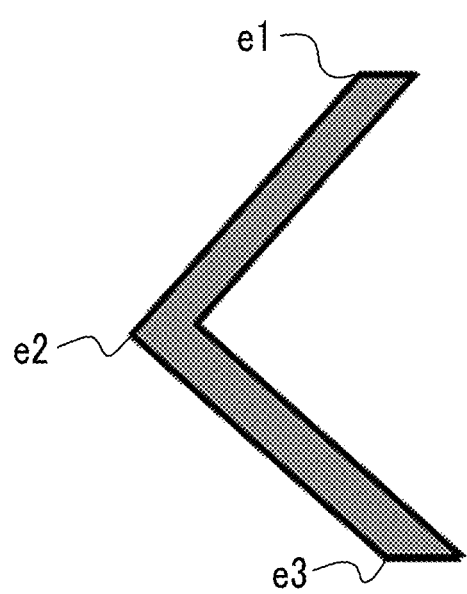
FIG. 6 shows an example of the servo pattern.
Figure 7:
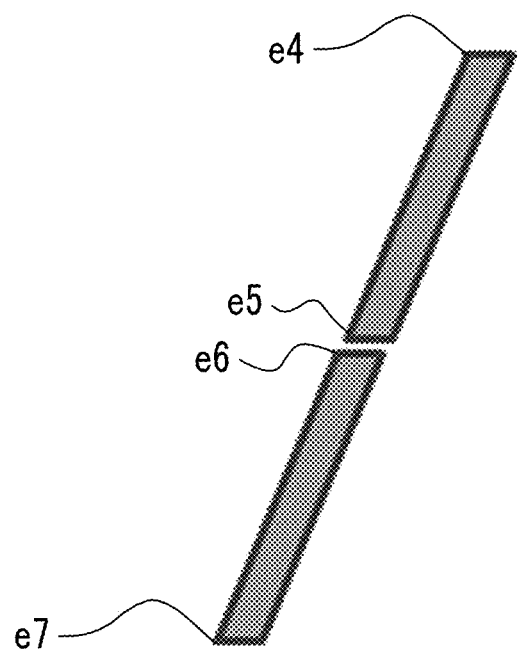
FIG. 7 shows an example of the servo pattern.
Figure 8:
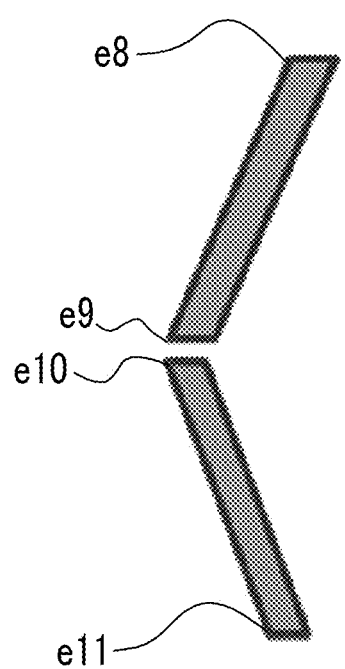
FIG. 8 shows an example of the servo pattern.

The "ideal shape" of an edge shape of the servo pattern in the present invention and this specification refers to an edge shape in a case where the servo pattern is formed without position deviation. For example, in an aspect, the servo pattern is a linear servo pattern extending continuously or discontinuously from one side toward the other side of the magnetic tape in a width direction. The "linear" for the servo pattern refers to that the pattern shape does not include a curved portion regardless of position deviation of the edge shape. "Continuous" refers to extending from one side toward the other side in a tape width direction without an inflection point of a tilt angle and without interruption. An example of the servo pattern extending continuously from one side toward the other side of the magnetic tape in a width direction is a servo pattern shown in FIG. 2. On the other hand, "discontinuous" refers to that there is one or more inflection points of a tilt angle and/or extending interruptedly at one or more portions. The shape that extends without interruption even though there is an inflection point of the tilt angle is a so-called polygonal line shape. An example of the discontinuous servo pattern extending from one side toward the other side in a tape width direction with one inflection point of the tilt angle and without interruption is a servo pattern shown in FIG. 6. On the other hand, an example of the discontinuous servo pattern extending from one side toward the other side in a tape width direction without an inflection point of the tilt angle and with interruption at one portion is a servo pattern shown in FIG. 7. In addition, an example of the discontinuous servo pattern extending from one side toward the other side in a tape width direction with one inflection point of the tilt angle and with interruption at one portion is a servo pattern shown in FIG. 8.

In a linear servo pattern that continuously extends from one side toward the other side in a tape width direction, the "ideal shape" of the edge shape is a shape of a line segment connecting two end portions of an edge on a downstream side in a running direction of the linear servo pattern (a linear shape). For example, the linear servo pattern shown in FIG. 2 has a shape of a straight line indicated by L1 in FIG. 3 or 4. On the other hand, in a linear servo pattern that extends discontinuously, the ideal shape is a shape of a line segment connecting one end and the other end of a portion with the same inclination angle (a linear shape) in a shape with an inflection point of a tilt angle. In addition, in the shape extending with interruption at one or more portions, the ideal shape is a shape of a line segment connecting one end and the other end of each continuously extending portion (linear shape). For example, in the servo pattern shown in FIG. 6, the ideal shape is a shape of a line segment connecting e1 and e2, and a line segment connecting e2 and e3. In the servo pattern shown in FIG. 7, the ideal shape is a shape of a line segment connecting e4 and e5, and a line segment connecting e6 and e7. In the servo pattern shown in FIG. 8, the ideal shape is a shape of a line segment connecting e8 and e9, and a line segment connecting e10 and e11.

In the above, a linear servo pattern has been described as an example. Here, the servo pattern may be a servo pattern in which an ideal shape of the edge shape is a curved shape. For example, in a servo pattern in which an edge shape on a downstream side with respect to a running direction is ideally a partial arc shape, it is possible to obtain a difference $(L_{99.9}-L_{0.1})$ from a position deviation width, of an edge shape on a downstream side with respect to a running direction, obtained from the position coordinates obtained by a magnetic force microscope, with respect to position coordinates of this partial arc.

As a magnetic force microscope used in the above measurement, a commercially available or known magnetic force microscope is used in a frequency modulation (FM) mode. As a probe of a magnetic force microscope, for example, SSS-MFMR (nominal curvature radius 15 nm) manufactured by Nanoworld AG can be used. A distance between a magnetic layer surface and a probe distal end during magnetic force microscopy is in a range of 20 to 50 nm.

In addition, as analysis software, commercially available analysis software or analysis software in which a known arithmetic expression is incorporated can be used.

In a case where the magnetic recording medium is a magnetic tape, the magnetic tape is usually accommodated in a magnetic tape cartridge and the magnetic tape cartridge is mounted in the magnetic recording and reproducing apparatus.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing apparatus for recording and/or reproducing data on the magnetic tape, the magnetic tape is pulled out of the magnetic tape cartridge to be wound around the reel on the magnetic recording and reproducing apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing apparatus side. During this time, data is recorded and/or reproduced as the magnetic head and the magnetic layer surface of the magnetic tape come into contact with each other to be slid on each other. With respect to this, in the twin reel type magnetic tape cartridge, both reels of the supply reel and the winding reel are provided in the magnetic tape cartridge. The magnetic tape cartridge may be either a single reel type or a dual reel type magnetic tape cartridge. For other details of the magnetic tape cartridge, the well-known technologies can be applied.

Magnetic Recording and Reproducing Apparatus

Another aspect of the present invention relates to a magnetic recording and reproducing apparatus comprising: the magnetic recording medium described above; and a magnetic head.

In the present invention and this specification, the "magnetic recording and reproducing apparatus" means an apparatus capable of performing at least one of the recording of data on the magnetic recording medium or the reproducing of data recorded on the magnetic recording medium. Such an apparatus is generally called a drive. The magnetic recording and reproducing apparatus can be a sliding type magnetic recording and reproducing apparatus. The sliding type magnetic recording and reproducing apparatus is an apparatus in which the magnetic layer surface and the magnetic head come into contact with each other to be slid on each other, in a case of performing the recording of data on the magnetic recording medium and/or reproducing of the recorded data.

The magnetic head included in the magnetic recording and reproducing apparatus can be a recording head capable of performing the recording of data on the magnetic recording medium, or can be a reproducing head capable of performing the reproducing of data recorded on the magnetic recording medium. In addition, in an aspect, the magnetic recording and reproducing apparatus can include both of a recording head and a reproducing head as separate magnetic heads. In another aspect, the magnetic head included in the magnetic recording and reproducing apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing apparatus. For example, a magnetic head that records data and/or reproduces recorded data (hereinafter also referred to as "recording and reproducing head") can include two servo signal reading elements, and the two servo signal reading elements can read two adjacent servo bands simultaneously. One or a plurality of elements for data can be disposed between the two servo signal reading elements.

In the magnetic recording and reproducing apparatus, recording of data on the magnetic recording medium and/or reproducing of data recorded on the magnetic recording medium can be performed as the magnetic layer surface of the magnetic recording medium and the magnetic head come into contact with each other to be slid on each other. The magnetic recording and reproducing apparatus has only to include the magnetic recording medium according to an aspect of the present invention, and the well-known technology can be applied to the others.

For example, in a case of recording data and/or reproducing the recorded data, first, tracking using a servo signal is performed. That is, by causing the servo signal reading element to follow a predetermined servo track, the element for data is controlled to pass on the target data track. Displacement of the data track is performed by changing a servo track to be read by the servo signal reading element in a tape width direction.

The recording and reproducing head can also perform recording and/or reproducing with respect to other data bands. In this case, the servo signal reading element may be displaced to a predetermined servo band using the above described UDIM information, and tracking for the servo band may be started.

EXAMPLES

Hereinafter, the present invention will be described with reference to examples. Here, the present invention is not limited to aspects shown in the examples. "Parts" and "%" in the following description mean "parts by mass" and "mass %", unless otherwise noted. "eq" is an equivalent and is a unit that cannot be converted into SI unit. Moreover, the following processes and evaluation were performed in the air of 23° C.±1° C., unless otherwise specified.

In a table below, "SR" represents hexagonal strontium ferrite powder, "ε" represents ε-iron oxide powder, and "BF" represents hexagonal barium ferrite powder.

The average particle size and the coefficient of variation in particle size distribution of each ferromagnetic powder in Table 1 described below are values obtained by the methods described above for the sample powder taken from the magnetic layer of each magnetic recording medium sample.

Moreover, a coercivity Hc of each ferromagnetic powder in Table 1 is a value measured with an application magnetic field of 15 kOe using a vibrating sample magnetometer (manufactured by Toei Industry Co., Ltd.).

The anisotropy magnetic field Hk of the magnetic layer of each magnetic recording medium in Table 1 is a value measured using a vibration sample type magnetometer of a TM-VSM5050-SMS type (manufactured by Tamagawa Co., Ltd.).

Magnetic Recording Medium No. 1

A magnetic recording medium (magnetic tape) No. 1 was manufactured by the following method.

List of Magnetic Layer Forming Composition

| | |
|---|---|
| Ferromagnetic powder (hexagonal barium ferrite powder) | 100.0 parts |
| Polyurethane resin | 12.2 parts |
| Weight-average molecular weight: 10000 | |
| Sulfonic acid group content: 0.5 meq/g | |
| Diamond particles | 1.85 parts |
| Average particle size: 50 nm | |
| Carbon black (# 55 manufactured by Asahi Carbon Co., Ltd.) | 0.5 parts |
| Average particle size: 0.015 μm | |
| Stearic acid | 0.5 parts |
| Butyl stearate | 2.1 parts |
| Methyl ethyl ketone | 180.0 parts |
| Cyclohexanone | 100.0 parts |

List of Non-Magnetic Layer Forming Composition

| | |
|---|---|
| Non-magnetic powder: α-iron oxide | 103.0 parts |
| Average particle size: 0.09 μm | |
| Brunauer-emmett-teller (BET) specific surface area: 50 m$^2$/g | |
| pH: 7 | |
| DBP (Dibutyl phthalate) oil absorption: 27-38 g/100 g | |
| Surface treatment agent: Al$_2$O$_3$ (8 mass %) | |
| Carbon black (Conductex SC-U manufactured by Colombian Carbon Co.) | 25.0 parts |
| Vinyl chloride copolymer (MR 104 manufactured by Kaneka Corporation) | 12.9 parts |
| Polyurethane resin (UR8200 manufactured by Toyobo Co., Ltd.) | 5.2 parts |
| Phenylphosphonic acid | 3.5 parts |
| Butyl stearate | 1.1 parts |
| Stearic acid | 2.1 parts |
| Methyl ethyl ketone | 205.0 parts |
| Cyclohexanone | 135.0 parts |

List of Back Coating Layer Forming Composition

| | |
|---|---|
| Non-magnetic powder: α-iron oxide | 80.0 parts |
| Average particle size: 0.15 μm | |
| Average acicular ratio: 7 | |
| BET specific surface area: 52 m$^2$/g | |
| Carbon black | 20.0 parts |
| Average particle size: 20 nm | |
| Vinyl chloride copolymer | 13.0 parts |
| Sulfonic acid group-containing polyurethane resin | 6.0 parts |
| Phenylphosphonic acid | 3.0 parts |
| Cyclohexanone | 155.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 200.0 parts |

Manufacturing of Magnetic Tape

For each of the magnetic layer forming composition and the non-magnetic layer forming composition, the various components described above were kneaded by a kneader. A solution was pumped through a horizontal sand mill filled with 65 volume % of zirconia beads having a particle size of 1.0 mm with respect to a volume of a dispersion unit, and was dispersed at 2000 revolution per minute (rpm) for 120 minutes (substantially retention time in the dispersion unit). Regarding the magnetic layer forming composition, the obtained dispersion liquid was filtered using a filter having a pore diameter of 1 μm, and thus a magnetic layer forming composition was obtained. Regarding the non-magnetic layer forming composition, after adding 6.5 parts of polyisocyanate and 7.0 parts of methyl ethyl ketone to the dispersion liquid obtained by the above dispersion, the dispersion liquid was filtered using a filter having a pore size of 1 μm, and thus non-magnetic layer forming composition was obtained.

The back coating layer forming composition was prepared by the following method. After kneading and diluting each component except a lubricant (stearic acid and butyl stearate), polyisocyanate, and 200.0 parts of cyclohexanone by an open kneader, a dispersion process of 12 passes was performed by a horizontal beads mill dispersing device using zirconia beads having a particle size of 1.0 mm with a bead filling rate of 80 volume %, a rotor tip circumferential speed of 10 m/sec, and a retention time per pass of 2 minutes. Thereafter, the remaining components were added into the dispersion liquid and were stirred by a dissolver. The obtained dispersion liquid was filtered using a filter having a pore diameter of 1 μm, and thus a back coating layer forming composition was obtained.

Thereafter, a non-magnetic layer forming composition was coated onto one surface of a non-magnetic support having a thickness of 5.0 μm and formed of a biaxially stretched polyethylene naphthalate and was dried so that a thickness after the drying becomes 0.1 μm, and thus a non-magnetic layer was formed.

Thereafter, the magnetic layer forming composition was coated onto the non-magnetic layer to form a coating layer. While the coating layer was in an undried state, a magnetic field having a magnetic field intensity of 0.6 T was applied in a direction perpendicular to a surface of the coating layer to perform vertical orientation process with respect to the surface of the coating layer and then to dry the surface of the coating layer, and thus a magnetic layer was formed.

Thereafter, the back coating layer forming composition was coated onto a surface of the non-magnetic support opposite to the one surface and was dried so that a thickness after drying becomes 0.4 μm, and thus a back coating layer was formed.

After that, a surface smoothing process (calendering process) was performed once using a calender configured with only a metal roll, at a calendering temperature (a surface temperature of the calender roll) of 95° C. and a linear pressure of 294 kN/m (0.98 kN/m=1 kg/cm). Then, a thermal process was performed in an environment of an atmosphere temperature of 70° C. for 36 hours. After the thermal process, slitting was performed so as to have a width of ½ inches (1 inch=0.0254 meters), and the magnetic layer surface was polished by a tape cleaning device in which a nonwoven fabric and a razor blade are attached to a device including a sending and winding device of a slit product so as to press the magnetic layer surface.

In a state where the magnetic layer of the obtained magnetic tape was demagnetized, a servo pattern (timing-based servo pattern) having a disposition and a shape according to an LTO Ultrium format was formed on the magnetic layer by a servo write head (leakage magnetic field: 3100 Oe) mounted on the servo writer. Accordingly, a magnetic tape including data bands, servo bands, and guide bands in the disposition according to the LTO Ultrium format in the magnetic layer, and including servo patterns having the disposition and the shape according to the LTO Ultrium format on the servo band was obtained.

Magnetic Recording Medium No. 2

A magnetic recording medium No. 2 was obtained in the same manner as the manufacturing of the magnetic recording medium No. 1, except that the ferromagnetic powder was changed from hexagonal barium ferrite powder to hexagonal strontium ferrite powder produced by the method described below.

Manufacturing of Ferromagnetic Powder (Hexagonal Strontium Ferrite Powder)

1621 g of $SrCO_3$, 637 g of $H_3BO_3$, 1106 g of $Fe_2O_3$, 27 g of $Al(OH)_3$ and 77 g of $BaCO_3$ were mixed by a mixer to obtain a raw material mixture.

The obtained raw material mixture was melted in a platinum crucible at a melting temperature of 1400° C., and a hot water outlet provided at a bottom of the platinum crucible was heated while stirring a melt, and the melt was discharged in a rod shape at about 6 g/second. Hot water was rolled and quenched by a water-cooled twin roller to manufacture an amorphous body.

280 g of the manufactured amorphous body was charged into an electric furnace, was heated to 607° C. (crystallization temperature) at a heating rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

Magnetic recording medium No. 3

A magnetic recording medium No. 3 was manufactured in the same manner as the manufacturing of the magnetic recording medium No. 2, except that the following points were changed in a step of manufacturing the ferromagnetic powder.

Hexagonal strontium ferrite powder was obtained in the same manner, except that 1611 g of $SrCO_3$, 637 g of $H_3BO_3$, 1094 g of $Fe_2O_3$, 113 g of $Al(OH)_3$, 24 g of $BaCO_3$, 38 g of $CaCO_3$, and 235 g of $Nd_2O_3$ were measured and mixed by a mixer to obtain a raw mixture and the crystallization temperature was changed to 616° C. in a step of manufacturing the ferromagnetic powder.

Magnetic Recording Medium No. 4

A magnetic recording medium No. 4 was manufactured in the same manner as the manufacturing of the magnetic recording medium No. 3, except that the crystallization temperature was changed to 619° C. in a step of manufacturing the ferromagnetic powder.

Magnetic Recording Medium No. 5

A magnetic recording medium No. 5 was manufactured in the same manner as the manufacturing of the magnetic recording medium No. 2, except that the following points were changed in a step of manufacturing the ferromagnetic powder.

Hexagonal strontium ferrite powder was obtained in the same manner, except that 1714 g of $SrCO_3$, 657 g of $H_3BO_3$, 1326 g of $Fe_2O_3$, 50 g of $Al(OH)_3$, 242 g of $CaCO_3$, 12 g of ZnO, and 20 g of $Nb_2O_5$ were measured and mixed by a mixer to obtain a raw mixture and the crystallization temperature was changed to 647° C. in a step of manufacturing the ferromagnetic powder.

Magnetic Recording Medium No. 6

A magnetic recording medium No. 6 was manufactured in the same manner as the manufacturing of the magnetic recording medium No. 5, except that the crystallization temperature was changed to 652° C. in a step of manufacturing the ferromagnetic powder.

Magnetic Recording Medium No. 7

A magnetic recording medium No. 7 was manufactured in the same manner as the manufacturing of the magnetic recording medium No. 2, except that the following points were changed in a step of manufacturing the ferromagnetic powder.

Hexagonal strontium ferrite powder was obtained in the same manner as the manufacturing of the magnetic recording medium No. 2, except that slurry washed by repeatedly performing decantation was diluted with an acetic acid aqueous solution of 10% concentration, the slurry was subjected to an ultrasonic dispersion process to be redispersed, a step of removing supernatant by performing centrifugal separation was repeated three times, and then the slurry was dried in a heating furnace at a furnace temperature of 110° C. for 6 hours, in a step of manufacturing the ferromagnetic powder.

Magnetic Recording Medium No. 8

A magnetic recording medium No. 8 was manufactured in the same manner as the manufacturing of the magnetic recording medium No. 7, except that the repeating number of a step of removing supernatant was changed to two in a step of manufacturing the ferromagnetic powder.

Magnetic Recording Medium No. 9

A magnetic recording medium No. 9 was manufactured in the same manner as the manufacturing of the magnetic recording medium No. 2, except that as 100.0 parts of the ferromagnetic powder used in the magnetic layer, ferromagnetic powder obtained by mixing 90.0 parts of the ferromagnetic powder manufactured by the same method as in the ferromagnetic powder used for the magnetic recording medium No. 2 and 10.0 parts of the ferromagnetic powder manufactured by the same method as in the ferromagnetic powder used for the magnetic recording medium No. 6 was used.

Magnetic Recording Medium No. 10

A magnetic recording medium No. 10 was manufactured in the same manner as the manufacturing of the magnetic recording medium No. 9, except that as 100.0 parts of the ferromagnetic powder used in the magnetic layer, ferromagnetic powder obtained by mixing 80.0 parts of the ferromagnetic powder manufactured by the same method as in the ferromagnetic powder used for the magnetic recording medium No. 2 and 20.0 parts of the ferromagnetic powder manufactured by the same method as in the ferromagnetic powder used for the magnetic recording medium No. 6 was used.

Magnetic Recording Medium Nos. 11 to 14

A magnetic recording medium Nos. 11 to 14 were manufactured in the same manner as the manufacturing of the magnetic recording medium No. 2, except that the coating amount of the magnetic layer forming composition at the time of forming the magnetic layer was changed.

Magnetic Recording Medium No. 15

A magnetic recording medium No. 15 was manufactured in the same manner as the manufacturing of the magnetic recording medium No. 2, except that the crystallization temperature was changed to 603° C. in a step of manufacturing the ferromagnetic powder.

Magnetic Recording Medium No. 16

A magnetic recording medium No. 16 was manufactured in the same manner as the manufacturing of the magnetic recording medium No. 2, except that the dispersion time in a step of obtaining the magnetic layer forming composition was changed to 100 minutes.

Magnetic Recording Medium No. 17

A magnetic recording medium No. 17 was manufactured in the same manner as the manufacturing of the magnetic recording medium No. 2, except that the dispersion time in a step of obtaining the magnetic layer forming composition was changed to 85 minutes.

Magnetic Recording Medium No. 18

A magnetic recording medium No. 18 was manufactured in the same manner as the manufacturing of the magnetic recording medium No. 2, except that the dispersion time in a step of obtaining the magnetic layer forming composition was changed to 100 minutes and the magnetic layer surface was polished after the slitting.

Magnetic Recording Medium No. 19

A magnetic layer forming composition 1 was prepared using a ferromagnetic powder (s-iron oxide powder) manufactured by the following method as the ferromagnetic powder in the same manner as the list and the method in the manufacturing of the magnetic recording medium No. 2. The magnetic layer forming composition 1 prepared in such a manner was diluted with a mixed solvent of methyl ethyl ketone and cyclohexanone having the same mixing ratio (mass basis) as that in preparing the magnetic layer forming composition 1, and then centrifugal separation (hereinafter, referred to as "centrifugal separation at the time of preparing the magnetic layer forming composition") was performed once, and a step of removing the supernatant (hereinafter, referred to as "a supernatant removing step at the time of preparing the magnetic layer forming composition") was performed once, to obtain a slurry. The obtained slurry was diluted with a mixed solvent of methyl ethyl ketone and cyclohexanone having the same mixing ratio (mass basis) as that in preparing the magnetic layer forming composition 1 so as to have the same concentration of solid contents as that of the magnetic layer forming composition 1 before dilution, to obtain a magnetic layer forming composition 2. A magnetic recording medium No. 19 was manufactured in the same manner as the manufacturing of the magnetic recording medium No. 2, except that the magnetic layer was formed using the magnetic layer forming composition 2 obtained in such a manner.

Manufacturing of Ferromagnetic Powder (ε-iron Oxide Powder)

8.6 g of iron(III) nitrate nonahydrate, 1.1 g of gallium(III) nitrate octahydrate, 151 mg of cobalt(II) nitrate hexahydrate, and 117 mg of titanium(IV) sulfate were dissolved in 90 g of pure water, and while the dissolved product was stirred using a magnetic stirrer, 3.9 g of an aqueous solution of 25 mass % ammonia was added to the dissolved product under a condition of an atmosphere temperature of 25° C. in an air atmosphere, and the dissolved product was stirred as it was for 2 hours. A citric acid aqueous solution obtained by dissolving 1.1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous solution of 25 mass % ammonia was dropwise added with stirring. After stirring for 1 hour while maintaining the liquid temperature at 50° C., 14 mL of tetraethoxysilane (TEOS) was dropwise added and was stirred for 24 hours to obtain a reaction solution. Powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1003° C. (firing temperature) in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide (ε-$Ga_{0.2}Co_{0.02}Ti_{0.02}Fe_{1.76}O_3$). In addition, powder X-ray diffraction (XRD) is performed, and from a peak of an XRD pattern, it is checked that the obtained ferromagnetic powder does not include α-phase and γ-phase crystal structures, and has a single-phase and ε-phase crystal structure.

Magnetic Recording Medium No. 20

A magnetic recording medium No. 20 was manufactured in the same manner as the manufacturing of the magnetic recording medium No. 19, except that in a step of manufacturing the ferromagnetic powder, the amount of iron (III) nitrate nonahydrate was changed to 9.1 g, cobalt (II) nitrate hexahydrate and titanium sulfate (1V) were not added, the firing temperature was changed to 975° C., and centrifugal separation was not performed during the preparation of the magnetic layer forming composition.

Magnetic Recording Medium No. 21

A magnetic recording medium No. 21 was manufactured in the same manner as the manufacturing of the magnetic recording medium No. 20, except that the firing temperature in a step of manufacturing the ferromagnetic powder was changed to 979° C.

Magnetic Recording Medium No. 22

A magnetic recording medium No. 22 was manufactured in the same manner as the manufacturing of the magnetic recording medium No. 20, except that in a step of manufacturing the ferromagnetic powder, the amount of iron (III) nitrate nonahydrate used was changed to 9.1 g and the amount of gallium nitrate (III) octahydrate was changed to 1.2 the firing temperature was changed to 1013° C., and the centrifugal separation was not performed during the preparation of the magnetic layer forming composition.

Magnetic Recording Medium No. 23

A magnetic recording medium No. 23 was manufactured in the same manner as the manufacturing of the magnetic recording medium No. 22, except that the firing temperature in a step of manufacturing the ferromagnetic powder was changed to 1016° C.

Magnetic Recording Medium No. 24

A magnetic recording medium No. 24 was manufactured in the same manner as the manufacturing of the magnetic recording medium No. 19, except that the centrifugal separation at the time of preparing the magnetic layer forming composition was performed three times.

Magnetic Recording Medium No. 25

A magnetic recording medium No. 25 was manufactured in the same manner as the manufacturing of the magnetic recording medium No. 19, except that the centrifugal separation at the time of preparing the magnetic layer forming composition was performed two times.

Magnetic Recording Medium No. 26

A magnetic recording medium No. 26 was manufactured in the same manner as the manufacturing of the magnetic recording medium No. 19, except that as 100.0 parts of the ferromagnetic powder used in the magnetic layer, ferromagnetic powder obtained by mixing 90.0 parts of the ferromagnetic powder manufactured by the same method as in the ferromagnetic powder used for the magnetic recording medium No. 19 and 10.0 parts of the ferromagnetic powder manufactured by the same method as in the ferromagnetic powder used for the magnetic recording medium No. 23 was used.

Magnetic Recording Medium No. 27

A magnetic recording medium No. 27 was manufactured in the same manner as the manufacturing of the magnetic recording medium No. 19, except that as 100.0 parts of the ferromagnetic powder used in the magnetic layer, ferromagnetic powder obtained by mixing 80.0 parts of the ferromagnetic powder manufactured by the same method as in the ferromagnetic powder used for the magnetic recording medium No. 19 and 20.0 parts of the ferromagnetic powder manufactured by the same method as in the ferromagnetic powder used for the magnetic recording medium No. 23 was used.

Magnetic Recording Medium Nos. 28 to 31

A magnetic recording medium Nos. 28 to 31 were manufactured in the same manner as the manufacturing of the magnetic recording medium No. 19, except that the coating amount of the magnetic layer forming composition at the time of forming the magnetic layer was changed.

Magnetic Recording Medium No. 32

A magnetic recording medium No. 32 was manufactured in the same manner as the manufacturing of the magnetic recording medium No. 19, except that the firing temperature in a step of manufacturing the ferromagnetic powder was changed to 997° C.

Magnetic Recording Medium No. 33

A magnetic recording medium No. 33 was manufactured in the same manner as the manufacturing of the magnetic recording medium No. 19, except that the dispersion time in a step of obtaining the magnetic layer forming composition was changed to 100 minutes.

Magnetic Recording Medium No. 34

A magnetic recording medium No. 34 was manufactured in the same manner as the manufacturing of the magnetic recording medium No. 19, except that the dispersion time in a step of obtaining the magnetic layer forming composition was changed to 85 minutes.

Magnetic Recording Medium No. 35

A magnetic recording medium No. 35 was manufactured in the same manner as the manufacturing of the magnetic recording medium No. 19, except that the dispersion time in a step of obtaining the magnetic layer forming composition was changed to 100 minutes and the magnetic layer surface was polished after the slitting.

Magnetic Recording Medium No. 36

The magnetic recording medium No. 36 was manufactured in the same manner as the manufacturing of the magnetic recording medium No. 7, except that the calendering temperature (a surface temperature of the calender roll) in the calendering process was changed to 100° C. and the number of calendering processes was changed to two.

Magnetic Recording Medium No. 37

The magnetic recording medium No. 37 was manufactured in the same manner as the manufacturing of the magnetic recording medium No. 24, except that the calendering temperature (a surface temperature of the calender roll) in the calendering process was changed to 100° C. and the number of calendering processes was changed to two.

Evaluation of Magnetic Tape (1) Sdc, Sac, and Sdc/Sac

The Sdc and Sac were obtained by the method described above. In addition, a ratio (Sdc/Sac) of the Sdc to the Sac was calculated from the obtained values. As a magnetic force microscope, Dimension 3100 manufactured by Bruker was used in a frequency modulation mode, and as a probe, SSS-MFMR (nominal curvature radius of 15 nm) manufactured by Nanoworld AG was used. A distance between a magnetic layer surface and a probe distal end during magnetic force microscopy was 20 nm. As image analysis software, MATLAB manufactured by MathWorks was used.

For the magnetic recording medium No. 20, a clear magnetic cluster could not be detected by a magnetic force microscope.

(2) Thickness of Magnetic Layer

The thickness of the magnetic layer of each magnetic tape manufactured was determined by the following method.

(i) Manufacturing of Cross Section Observing Sample

According to a method described in paragraphs 0193 and 0194 of JP2016-177851A, a cross section observing sample including the entire region in the thickness direction from the magnetic layer side surface of the magnetic tape to the back coating layer side surface was manufactured.

(ii) Thickness Measurement

The manufactured sample was observed with a STEM, and a STEM image was captured. This STEM image is a STEM-HAADF (high-angle annular dark field) image captured at an acceleration voltage of 300 kV and an imaging magnification of 450,000 times, and imaging was performed so that the entire region in the thickness direction from the magnetic layer side surface of the magnetic tape to the back coating layer side surface was included in one image. In such an obtained STEM image, a straight line connecting both ends of a line segment representing the magnetic layer surface was determined as a reference line representing the magnetic layer side surface of the magnetic tape. The straight line connecting both ends of the above-mentioned line segment is, for example, a straight line connecting an intersection between a left side of the image of the STEM image (a shape thereof is rectangular or square) and the line segment, and an intersection between a right side of the STEM image and the line segment, in a case where the STEM image is captured so that the magnetic layer side of the cross section observing sample is positioned at an upper portion of the image and the back coating layer side is positioned at a lower portion of the image. Similarly, a reference line representing an interface between the magnetic layer and the non-magnetic layer was determined.

The thickness of the magnetic layer was obtained as an arithmetic average of thicknesses obtained as the shortest distance from the reference line representing the magnetic layer side surface of the magnetic tape to the reference line representing an interface between the magnetic layer and the non-magnetic layer at 10 randomly extracted portions.

(3) Difference ($L_{99.9}-L_{0.1}$)

A difference ($L_{99.9}-L_{0.1}$) was obtained for each magnetic tape of the examples and comparative examples by the following method.

Using Dimension 3100 manufactured by Bruker as a magnetic force microscope in a frequency modulation mode and SSS-MFMR (nominal curvature radius of 15 nm) manufactured by Nanoworld AG as a probe, in a range of 90 µm×90 µm of the magnetic layer surface of the magnetic tape on which the servo pattern was formed, rough measurement was performed at a pitch of 100 nm to extract a servo pattern (magnetization region). A distance between a magnetic layer surface and a probe distal end during magnetic force microscopy was 20 nm. Since the above measurement range includes the five servo patterns of the A burst formed in accordance with the LTO Ultrium format, these five servo patterns were extracted.

The magnetic profile was obtained by measuring the vicinity of the boundary between the magnetization region and the non-magnetized region at a pitch of 5 nm, using the magnetic force microscope and the probe, in a downstream edge of each servo pattern in a running direction. Since the obtained magnetic profile was inclined at an angle $\alpha=12°$, rotation correction was performed by analysis software so that the angle $\alpha=0°$.

The measurement was performed at three different portions on the magnetic layer surface. Each measurement range includes five servo patterns of the A burst.

Thereafter, the difference ($L_{99.9}-L_{0.1}$) was obtained by the method described above using analysis software. As analysis software, MATLAB manufactured by MathWorks was used. Such an obtained difference ($L_{99.9}-L_{0.1}$) is shown in Table 1.

(4) Position Error Signal (PES)

As an index of head positioning accuracy in the servo system, PES obtained by the following method can be exemplified. PES means that the smaller the value is, the higher the head positioning accuracy in the servo system is.

For each magnetic recording medium, the servo pattern was read by a verification head on the servo writer used for forming the servo pattern. The verification head is a reading magnetic head for checking the quality of the servo pattern formed on the magnetic tape. Like the magnetic head of a known magnetic recording and reproducing apparatus, a reading element is disposed at a position corresponding to a position of the servo pattern (specifically, a position of the magnetic tape in a width direction).

A known PES arithmetic circuit is connected to the verification head for calculating the head positioning accuracy in the servo system as PES from an electric signal obtained by reading the servo pattern with the verification head. A displacement of the magnetic tape in the width direction was calculated as needed from the input electric signal (pulse signal) by the PES arithmetic circuit, and a value obtained by applying a high-pass filter (cut off value: 500 cycles/m) with respect to the temporal change information (signal) of this displacement) was calculated as PES. The calculated PES is shown in Table 1.

The above results are shown in Table 1.

TABLE 1

| Example/Comparative Example | Magnetic Recording Medium No. | Ferromagnetic Powder | | | Magnetic Layer | | | | | | | |
|---|---|---|---|---|---|---|---|---|---|---|---|---|
| | | Type | Average Particle Size (nm) | Coefficient of Variation in Particle Size Distribution (%) | Coercivity Hc (Oe) | Thickness (nm) | Anisotropy Magnetic Field Hk (kOe) | Sdc $10^4$ nm$^2$ | Sac $10^4$ nm$^2$ | Sdc/Sac — | Difference ($L_{99.9} - L_{0.1}$) (nm) | PES |
| Comparative Example | 1 | BF | 20 | 26 | 2013 | 57 | 15.6 | 0.8 | 0.9 | 0.9 | 204 | 10.9 |
| Example | 2 | SR | 15 | 27 | 2231 | 55 | 19.1 | 0.6 | 0.6 | 1.0 | 143 | 7.9 |
| Example | 3 | SR | 8 | 20 | 2003 | 56 | 23.4 | 0.5 | 0.5 | 0.9 | 159 | 7.9 |
| Example | 4 | SR | 10 | 22 | 2054 | 55 | 23.8 | 0.5 | 0.5 | 1.0 | 140 | 7.8 |
| Example | 5 | SR | 19 | 30 | 2210 | 54 | 20.2 | 0.7 | 0.6 | 1.0 | 161 | 8.4 |
| Comparative Example | 6 | SR | 21 | 31 | 2350 | 56 | 20.4 | 0.7 | 0.7 | 1.1 | 201 | 11.1 |
| Example | 7 | SR | 15 | 12 | 2154 | 56 | 18.7 | 0.4 | 0.5 | 1.0 | 145 | 7.4 |
| Example | 8 | SR | 14 | 21 | 2176 | 57 | 19.0 | 0.5 | 0.4 | 1.0 | 147 | 7.3 |
| Example | 9 | SR | 15 | 34 | 2245 | 54 | 20.5 | 2.1 | 1.8 | 1.2 | 165 | 8.5 |
| Example | 10 | SR | 15 | 37 | 2135 | 55 | 21.3 | 2.7 | 2.2 | 1.2 | 171 | 8.6 |
| Example | 11 | SR | 15 | 27 | 2237 | 19 | 19.2 | 0.6 | 0.6 | 1.1 | 166 | 8.4 |
| Example | 12 | SR | 15 | 27 | 2246 | 24 | 19.3 | 0.6 | 0.6 | 1.1 | 149 | 8.5 |
| Example | 13 | SR | 15 | 27 | 2254 | 145 | 19.4 | 3.2 | 2.5 | 1.3 | 151 | 8.5 |
| Example | 14 | SR | 15 | 27 | 2264 | 153 | 19.5 | 3.4 | 2.7 | 1.3 | 167 | 8.6 |
| Example | 15 | SR | 13 | 30 | 1906 | 57 | 18.7 | 2.1 | 1.7 | 1.2 | 170 | 8.6 |
| Example | 16 | SR | 15 | 27 | 2236 | 57 | 19.5 | 4.8 | 3.0 | 1.6 | 168 | 8.5 |
| Comparative Example | 17 | SR | 15 | 27 | 2190 | 58 | 20.4 | 5.0 | 3.2 | 1.6 | 223 | 9.9 |
| Example | 18 | SR | 15 | 27 | 2214 | 57 | 19.2 | 4.9 | 2.4 | 2.0 | 164 | 8.7 |
| Example | 19 | ε | 13 | 28 | 2334 | 58 | 30.6 | 0.4 | 0.4 | 1.2 | 145 | 7.8 |
| Comparative Example | 20 | ε | 4 | 20 | 2014 | 59 | 26.3 | — | — | — | — | — |
| Example | 21 | ε | 7 | 22 | 2025 | 60 | 30.1 | 0.4 | 0.3 | 1.1 | 144 | 7.8 |
| Example | 22 | ε | 18 | 30 | 2456 | 58 | 31.4 | 0.8 | 0.7 | 1.1 | 171 | 8.5 |
| Comparative Example | 23 | ε | 21 | 31 | 2621 | 58 | 32.6 | 0.9 | 0.9 | 1.0 | 203 | 10.2 |
| Example | 24 | ε | 13 | 14 | 2301 | 56 | 30.0 | 0.4 | 0.3 | 1.1 | 148 | 7.3 |
| Example | 25 | ε | 13 | 23 | 2342 | 58 | 30.1 | 0.4 | 0.4 | 1.1 | 146 | 7.8 |
| Example | 26 | ε | 14 | 34 | 2275 | 57 | 32.1 | 1.7 | 1.6 | 1.1 | 161 | 8.3 |
| Example | 27 | ε | 14 | 39 | 2307 | 59 | 33.4 | 2.4 | 2.1 | 1.1 | 159 | 8.4 |
| Example | 28 | ε | 13 | 28 | 2345 | 19 | 30.2 | 0.5 | 0.5 | 1.0 | 166 | 8.3 |
| Example | 29 | ε | 13 | 28 | 2335 | 23 | 30.0 | 0.4 | 0.4 | 1.1 | 157 | 7.8 |
| Example | 30 | ε | 13 | 28 | 2346 | 144 | 31.7 | 3.1 | 2.8 | 1.1 | 157 | 7.7 |
| Example | 31 | ε | 13 | 28 | 2351 | 156 | 31.8 | 3.3 | 3.1 | 1.1 | 160 | 8.4 |
| Example | 32 | ε | 13 | 30 | 1923 | 54 | 30.1 | 2.4 | 2.1 | 1.2 | 162 | 8.6 |
| Example | 33 | ε | 13 | 28 | 2318 | 57 | 32.1 | 4.7 | 3.0 | 1.6 | 163 | 8.5 |
| Comparative Example | 34 | ε | 13 | 28 | 2309 | 58 | 33.4 | 5.1 | 3.6 | 1.4 | 222 | 12.3 |
| Example | 35 | ε | 13 | 28 | 2347 | 59 | 30.2 | 4.9 | 2.3 | 2.1 | 162 | 8.8 |
| Example | 36 | SR | 15 | 12 | 2156 | 54 | 18.6 | 0.2 | 0.3 | 0.9 | 139 | 7.1 |
| Example | 37 | ε | 13 | 14 | 2297 | 53 | 30.1 | 0.2 | 0.3 | 0.9 | 140 | 7.0 |

It can be checked from the results shown in Table 1 that the magnetic recording medium of the example comprising the magnetic layer including the ferromagnetic powder selected from the group consisting of hexagonal strontium ferrite powder and ε-iron oxide powder has a smaller PES value and higher following accuracy of the magnetic head to the data track in the servo system than the magnetic recording medium of the comparative example comprising the magnetic layer including a ferromagnetic powder selected from the group consisting of hexagonal strontium ferrite powder and ε-iron oxide powder.

Furthermore, it can be checked from an evaluation result for the magnetic recording medium No. 1 (comparative example) shown in Table 1 that in a case where the ferromagnetic powder included in the magnetic layer is the hexagonal barium ferrite powder, even though the average particle size of the ferromagnetic powder and the Sdc of the magnetic recording medium are controlled within the ranges described above, the head positioning accuracy in the servo system is not improved.

An aspect of the present invention is effective in a technical field of a magnetic recording medium for high-density recording.

What is claimed is:

1. A magnetic recording medium comprising:
   a non-magnetic support; and
   a magnetic layer including ferromagnetic powder and a binding agent,
   wherein the ferromagnetic powder is selected from the group consisting of hexagonal strontium ferrite powder and ε-iron oxide powder, and has an average particle size of 5 nm or more and 20 nm or less,
   wherein the magnetic layer has a servo pattern, and
   wherein an average area Sdc of magnetic clusters of the magnetic recording medium in a DC demagnetization state, measured by a magnetic force microscope is $0.2 \times 10^4$ nm$^2$ or more and less than $5.0 \times 10^4$ nm$^2$.

2. The magnetic recording medium according to claim 1,
wherein a ratio Sdc/Sac of the Sdc to an average area Sac of magnetic clusters of the magnetic recording medium in an AC demagnetization state, measured by a magnetic force microscope is 0.8 or more and 2.0 or less.

3. The magnetic recording medium according to claim 1,
wherein the magnetic recording medium is a magnetic tape,
wherein the servo pattern is a timing-based servo pattern, and
wherein an edge shape of the timing-based servo pattern, specified by magnetic force microscopy is a shape in which a difference $L_{99.9}-L_{0.1}$ between a value $L_{99.9}$ of a cumulative distribution function of 99.9% and a value $L_{0.1}$ of a cumulative distribution function of 0.1% in a position deviation width from an ideal shape of the magnetic tape in a longitudinal direction is 180 nm or less.

4. The magnetic recording medium according to claim 2,
wherein the magnetic recording medium is a magnetic tape,
wherein the servo pattern is a timing-based servo pattern, and
wherein an edge shape of the timing-based servo pattern, specified by magnetic force microscopy is a shape in which a difference $L_{99.9}-L_{0.1}$ between a value $L_{99.9}$ of a cumulative distribution function of 99.9% and a value $L_{0.1}$ of a cumulative distribution function of 0.1% in a position deviation width from an ideal shape of the magnetic tape in a longitudinal direction is 180 nm or less.

5. The magnetic recording medium according to claim 1, wherein the Sdc is $0.2\times10^4$ nm$^2$ or more and less than $0.3\times10^4$ nm$^2$.

6. The magnetic recording medium according to claim 2, wherein the Sdc is $0.2\times10^4$ nm$^2$ or more and less than $0.3\times10^4$ nm$^2$.

7. The magnetic recording medium according to claim 3, wherein the Sdc is $0.2\times10^4$ nm$^2$ or more and less than $0.3\times10^4$ nm$^2$.

8. The magnetic recording medium according to claim 4, wherein the Sdc is $0.2\times10^4$ nm$^2$ or more and less than $0.3\times10^4$ nm$^2$.

9. A magnetic recording and reproducing apparatus comprising:
the magnetic recording medium according to claim 1; and
a magnetic head.

10. The magnetic recording and reproducing apparatus according to claim 9,
wherein a ratio Sdc/Sac of the Sdc to an average area Sac of magnetic clusters of the magnetic recording medium in an AC demagnetization state, measured by a magnetic force microscope is 0.8 or more and 2.0 or less.

11. The magnetic recording and reproducing apparatus according to claim 9,
wherein the magnetic recording medium is a magnetic tape,
wherein the servo pattern is a timing-based servo pattern, and
wherein an edge shape of the timing-based servo pattern, specified by magnetic force microscopy is a shape in which a difference $L_{99.9}-L_{0.1}$ between a value $L_{99.9}$ of a cumulative distribution function of 99.9% and a value $L_{0.1}$ of a cumulative distribution function of 0.1% in a position deviation width from an ideal shape of the magnetic tape in a longitudinal direction is 180 nm or less.

12. The magnetic recording and reproducing apparatus according to claim 10,
wherein the magnetic recording medium is a magnetic tape,
wherein the servo pattern is a timing-based servo pattern, and
wherein an edge shape of the timing-based servo pattern, specified by magnetic force microscopy is a shape in which a difference $L_{99.9}-L_{0.1}$ between a value $L_{99.9}$ of a cumulative distribution function of 99.9% and a value $L_{0.1}$ of a cumulative distribution function of 0.1% in a position deviation width from an ideal shape of the magnetic tape in a longitudinal direction is 180 nm or less.

13. The magnetic recording and reproducing apparatus according to claim 9,
wherein the Sdc is $0.2\times10^4$ nm$^2$ or more and less than $0.3\times10^4$ nm$^2$.

14. The magnetic recording reproducing apparatus according to claim 10,
wherein the Sdc is $0.2\times10^4$ nm$^2$ or more and less than $0.3\times10^4$ nm$^2$.

15. The magnetic recording and reproducing apparatus according to claim 11,
wherein the Sdc is $0.2\times10^4$ nm$^2$ or more and less than $0.3\times10^4$ nm$^2$.

16. The magnetic recording and reproducing apparatus according to claim 12,
wherein the Sdc is $0.2\times10^4$ nm$^2$ or more and less than $0.3\times10^4$ nm$^2$.

* * * * *